United States Patent [19]
Sawdon

[11] Patent Number: 5,435,049
[45] Date of Patent: * Jul. 25, 1995

[54] APPARATUS FOR JOINING SHEET MATERIAL

[75] Inventor: Edwin G. Sawdon, St. Clair, Mich.

[73] Assignee: BTM Corporation, Marysville, Mich.

[ * ] Notice: The portion of the term of this patent subsequent to Mar. 27, 2007 has been disclaimed.

[21] Appl. No.: 163,333

[22] Filed: Dec. 6, 1993

Related U.S. Application Data

[60] Continuation-in-part of Ser. No. 927,214, Aug. 10, 1992, Pat. No. 5,267,383, which is a division of Ser. No. 694,141, May 1, 1991, Pat. No. 5,150,513, which is a division of Ser. No. 468,579, Jan. 23, 1990, Pat. No. 5,027,503, which is a division of Ser. No. 175,941, Mar. 31, 1988, Pat. No. 4,910,853, which is a division of Ser. No. 853,130, Apr. 17, 1986, Pat. No. 4,757,609, which is a continuation-in-part of Ser. No. 607,948, May 7, 1984, abandoned, which is a division of Ser. No. 495,440, May 17, 1983, Pat. No. 4,459,735, which is a continuation of Ser. No. 184,951, Sep. 8, 1980, abandoned.

[51] Int. Cl.[6] .............................................. B21D 39/00
[52] U.S. Cl. .................................... 29/243.5; 29/283.5
[58] Field of Search ................... 29/243.5, 283.5, 21.1, 29/509, 522.1, 432, 432.1, 798

[56] References Cited

U.S. PATENT DOCUMENTS

| | | |
|---|---|---|
| 2,713,197 | 7/1955 | Schmidt . |
| 3,198,155 | 8/1965 | Fraze . |
| 3,338,463 | 8/1967 | Henrickson . |
| 3,359,935 | 12/1967 | Rosbottom . |
| 3,404,648 | 10/1968 | Rosbottom . |
| 3,771,216 | 11/1973 | Johnson . |
| 4,208,776 | 6/1980 | Schleicher .............................. 29/509 |
| 4,459,735 | 7/1984 | Sawdon . |
| 4,601,090 | 7/1986 | Gunter . |
| 4,660,403 | 4/1987 | Slasinski .............................. 29/283.5 |
| 4,757,609 | 7/1988 | Sawdon . |
| 4,910,853 | 3/1990 | Sawdon .............................. 29/283.5 |
| 5,031,442 | 7/1991 | Kynl . |
| 5,155,897 | 10/1992 | Schleicher .............................. 29/509 |
| 5,177,861 | 1/1993 | Sawdon .............................. 29/283.5 |
| 5,259,102 | 11/1993 | Obrecht .............................. 29/509 |
| 5,267,383 | 12/1993 | Sawdon .............................. 29/243.5 |

FOREIGN PATENT DOCUMENTS

| | | |
|---|---|---|
| 1237574 | 6/1988 | Canada . |
| 2069394A | 8/1981 | United Kingdom . |
| WO/9115316 | 10/1991 | WIPO . |

OTHER PUBLICATIONS

TOG-L-LOC (1988).
TOG-L-LOC & Lance-N-Loc (1982).

Primary Examiner—David P. Bryant
Attorney, Agent, or Firm—Harness, Dickey & Pierce

[57] ABSTRACT

There is disclosed an improved apparatus for joining a plurality of pieces of sheet metal or other sheet material items by first drawing and then laterally extruding portions of the material to be joined into an enlarged shape which will permanently mechanically interlock the sheet material pieces. The apparatus utilizes a novel die construction in which portions thereof are resiliently biased toward one another and pivot and/or slide laterally outwardly in response to lateral extrusion of the joining material, and which is applicable to conventional "lanced" type joints as well as to a novel leakproof joint.

57 Claims, 11 Drawing Sheets

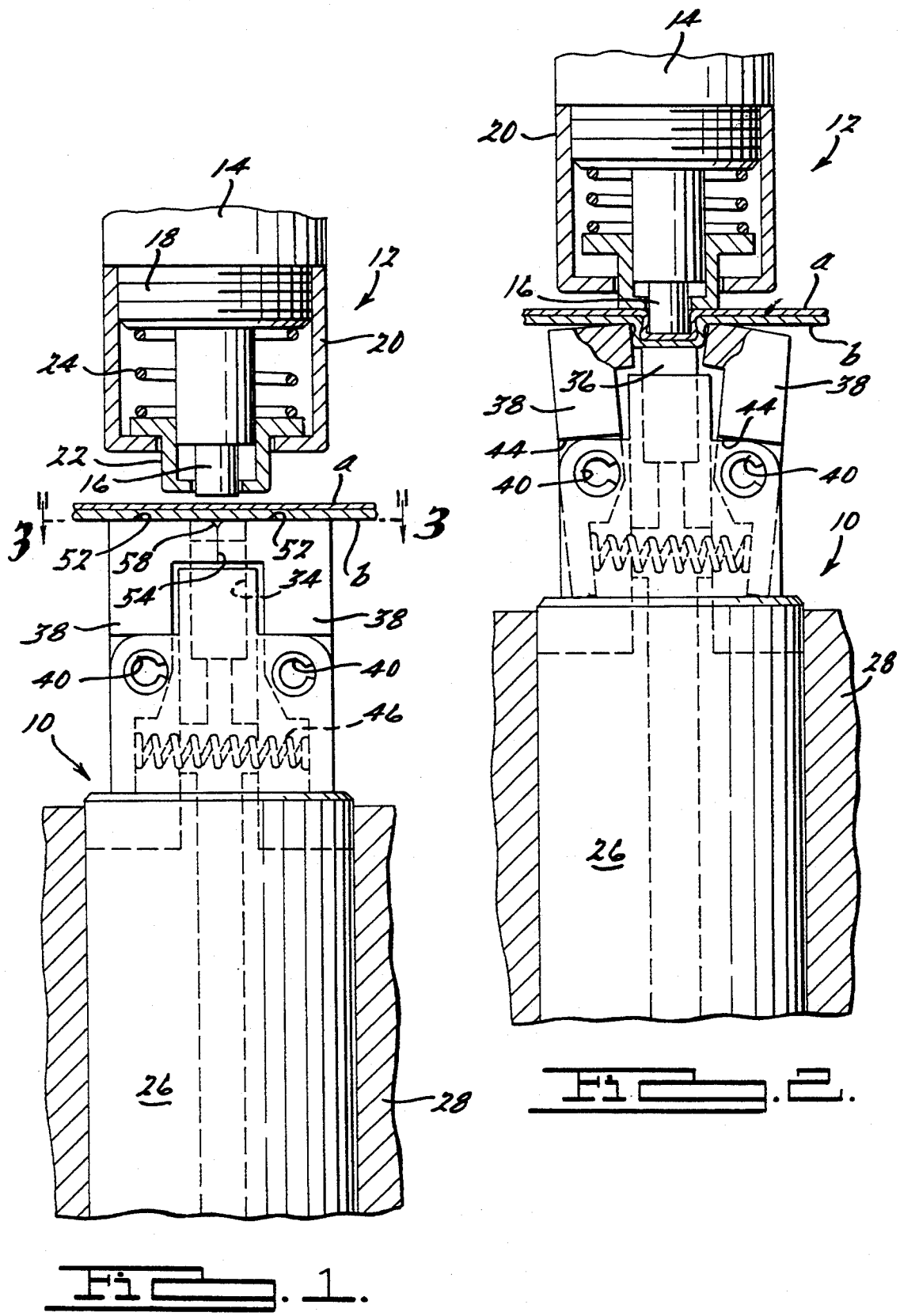

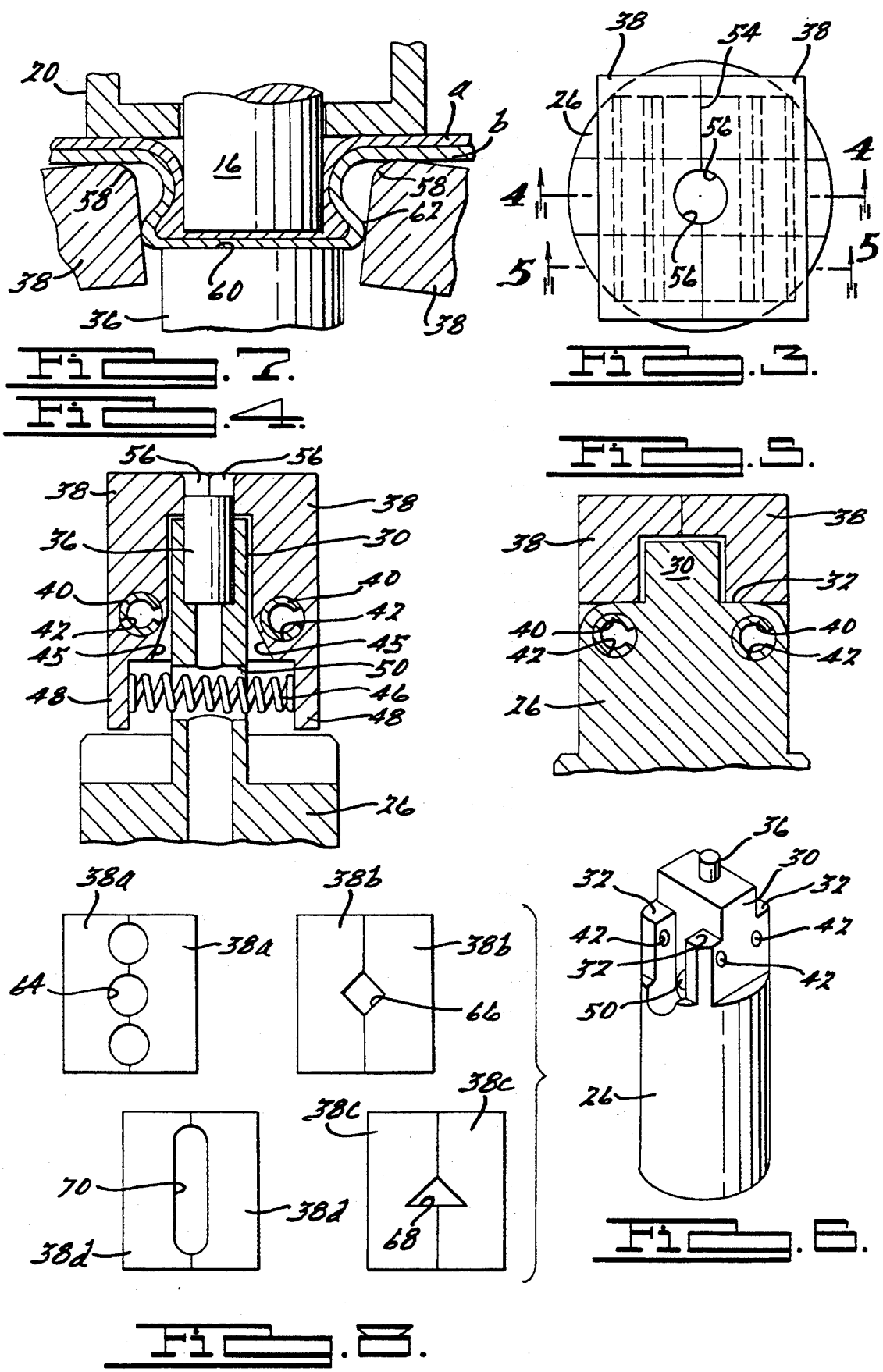

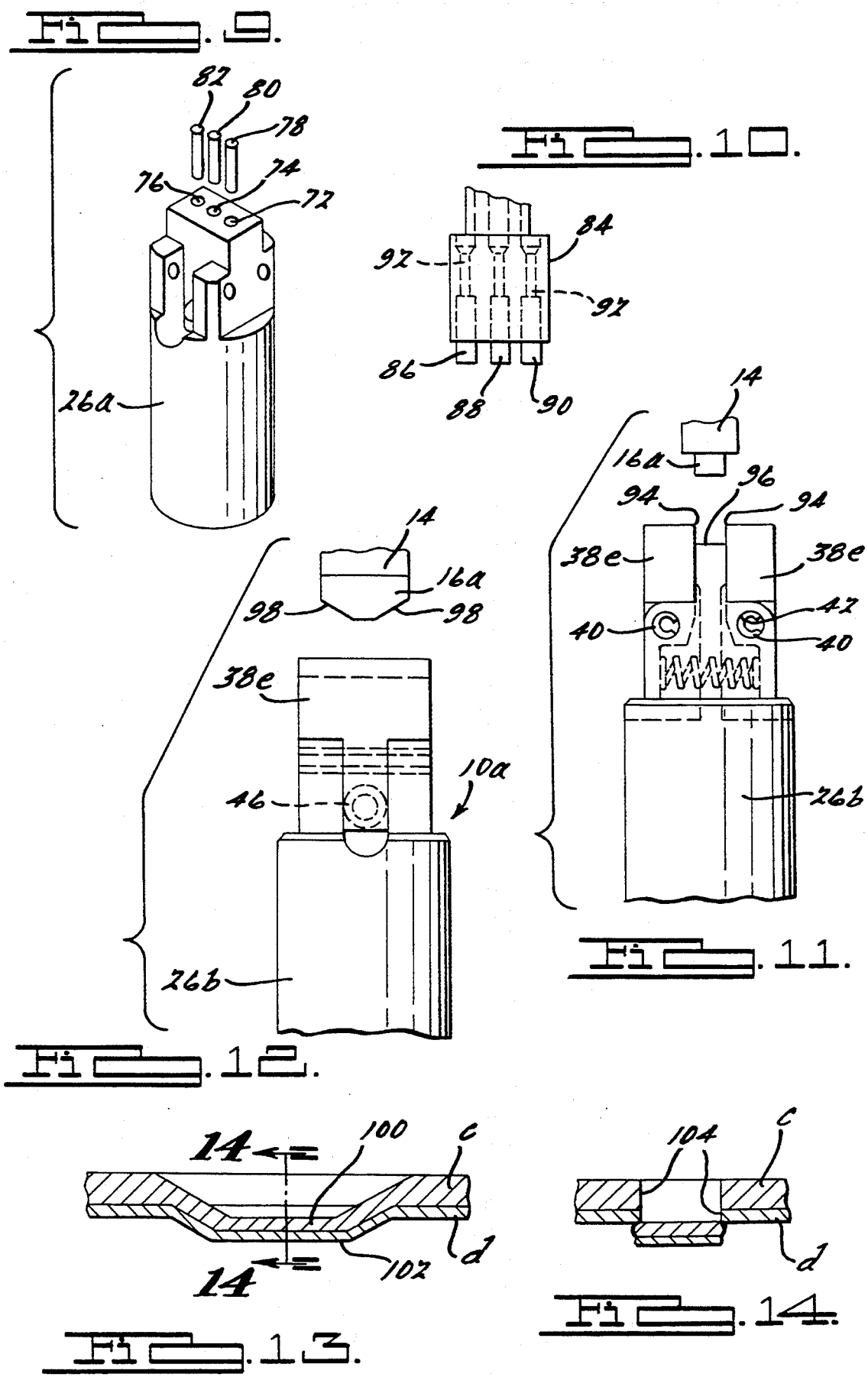

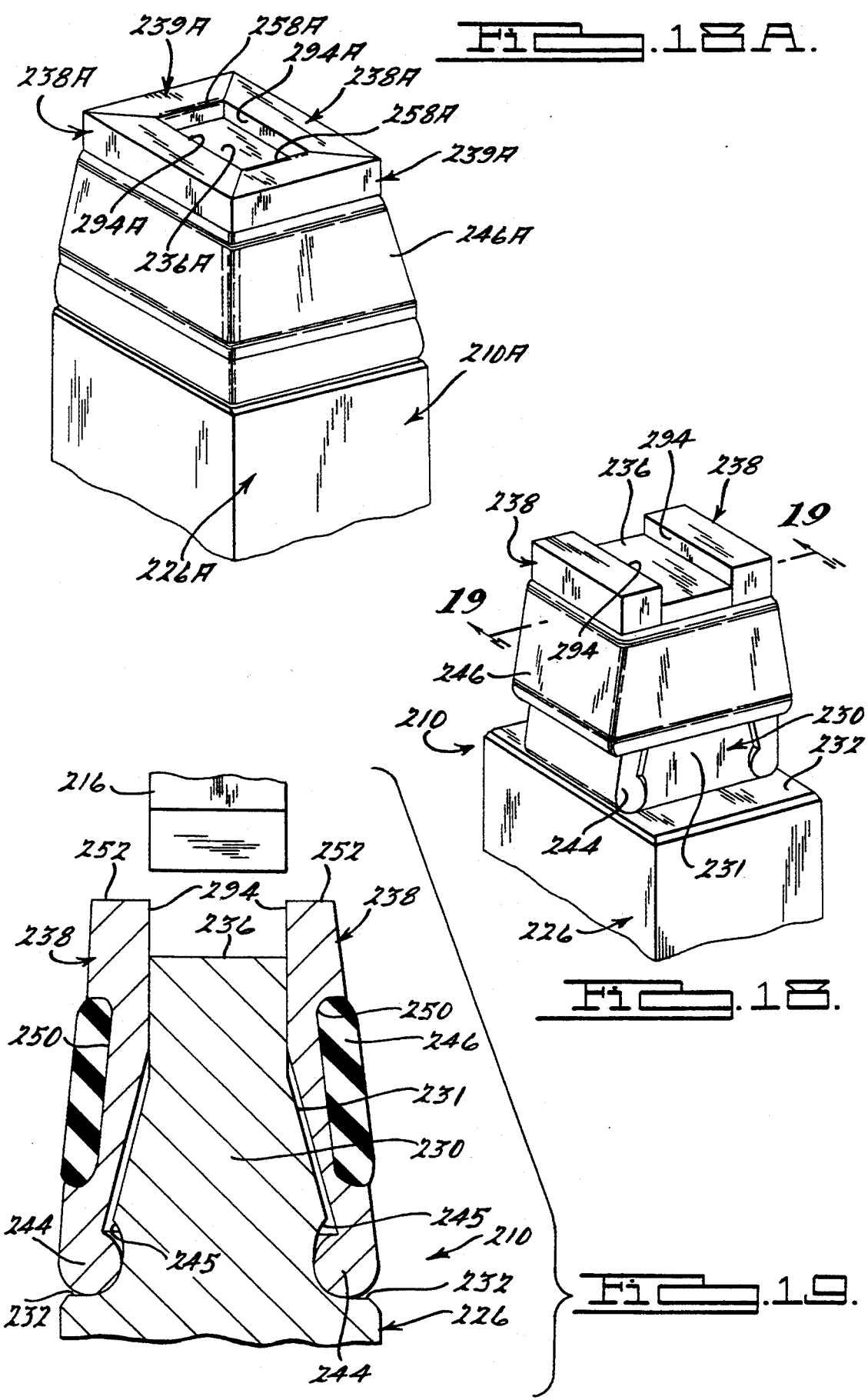

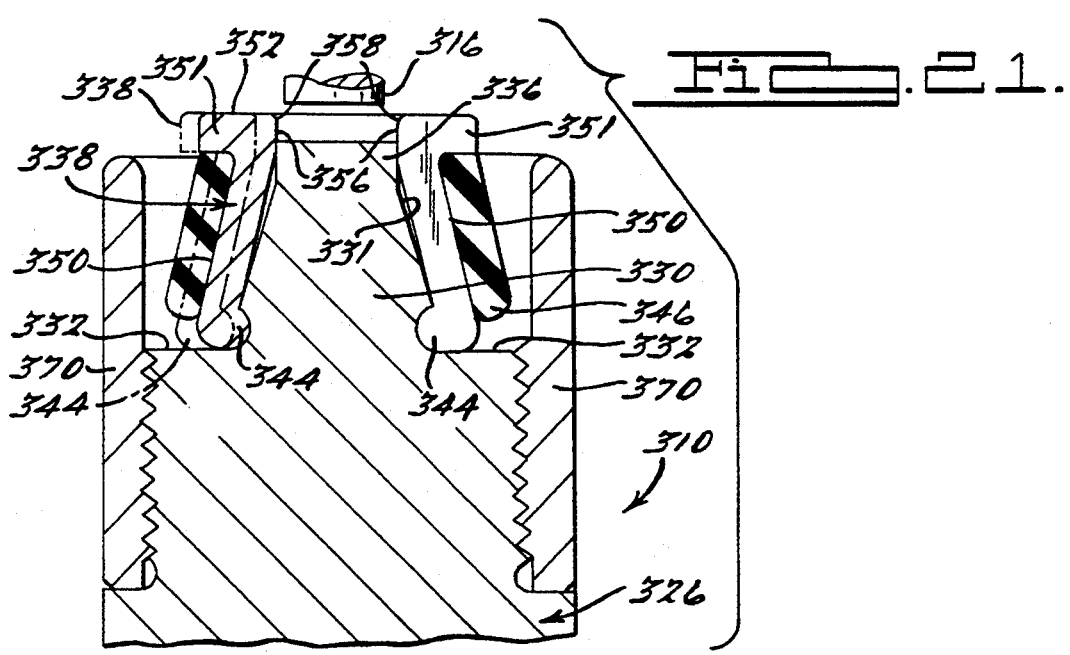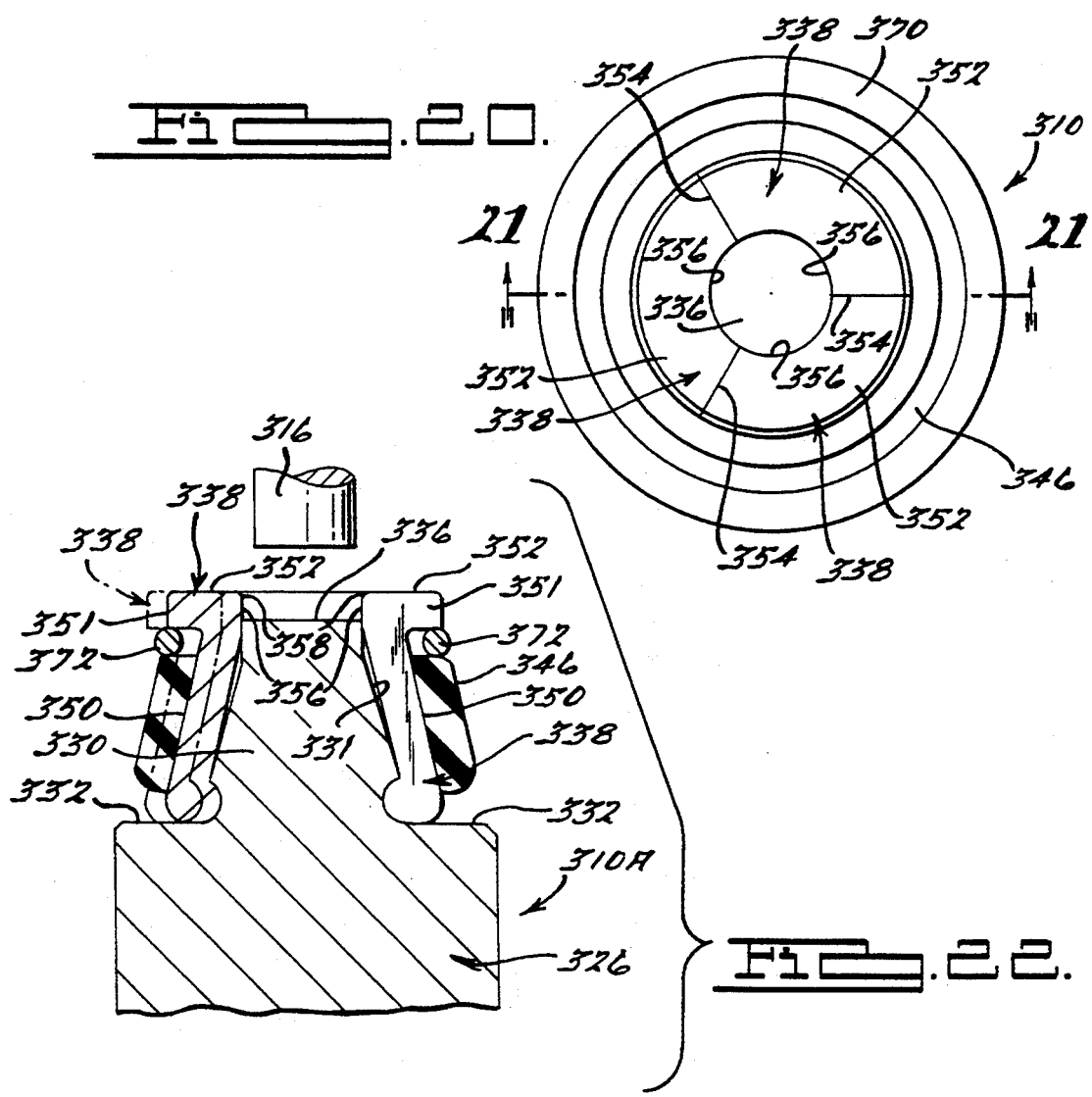

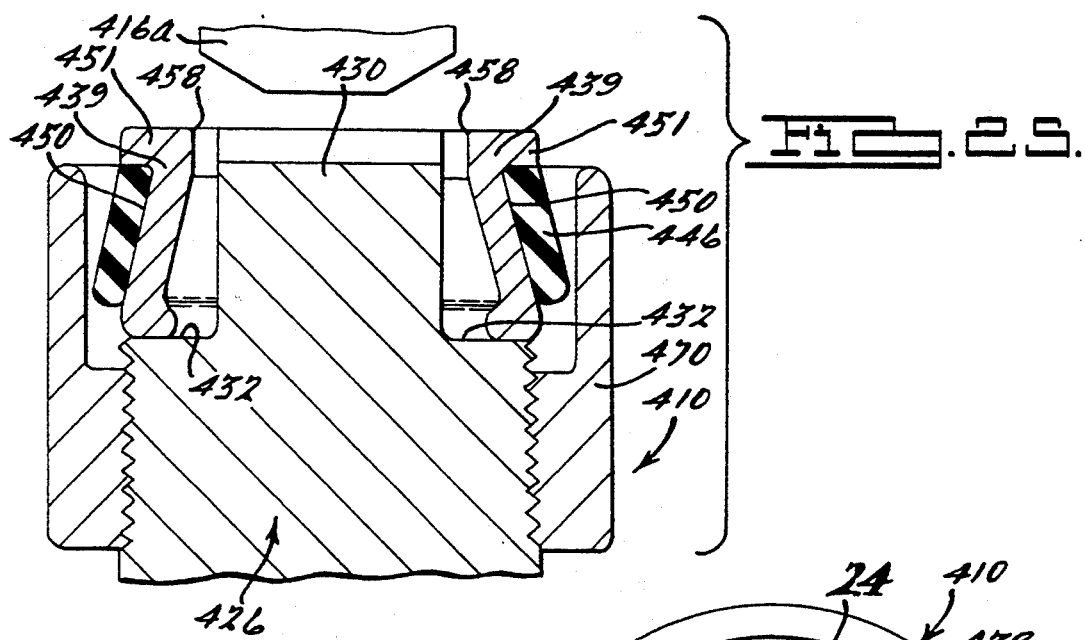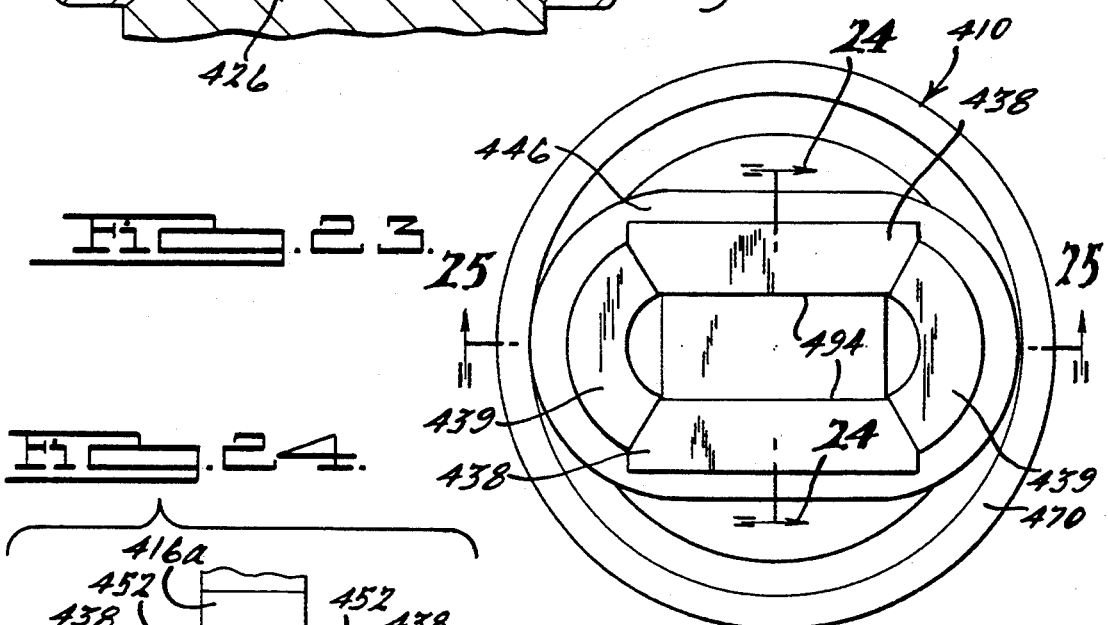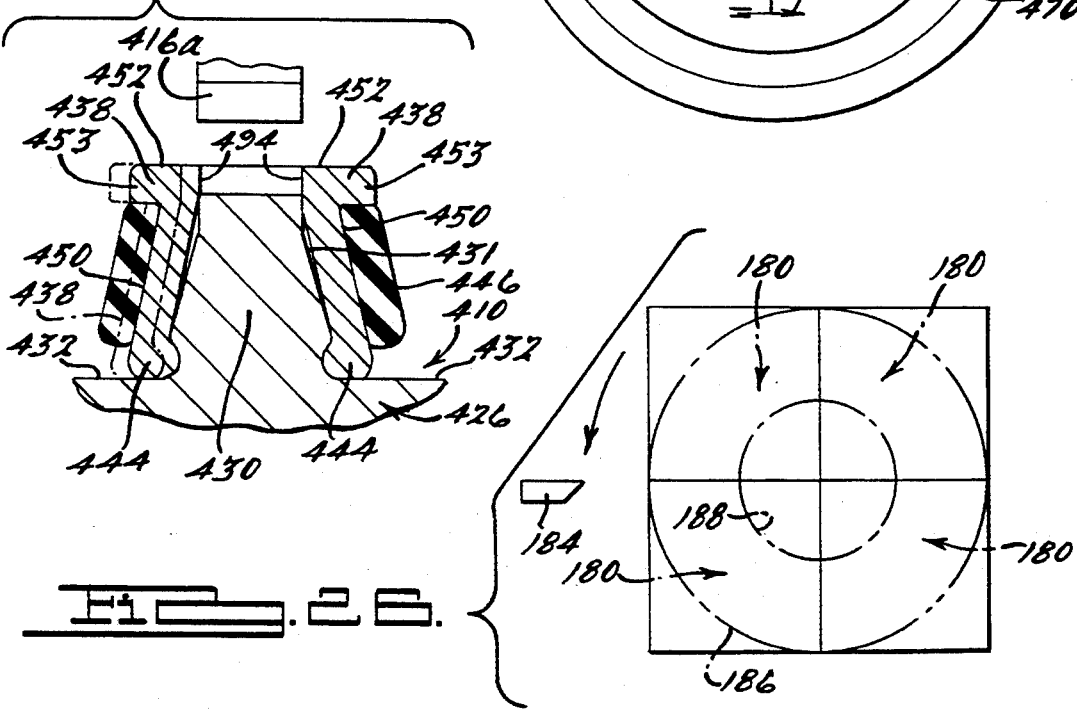

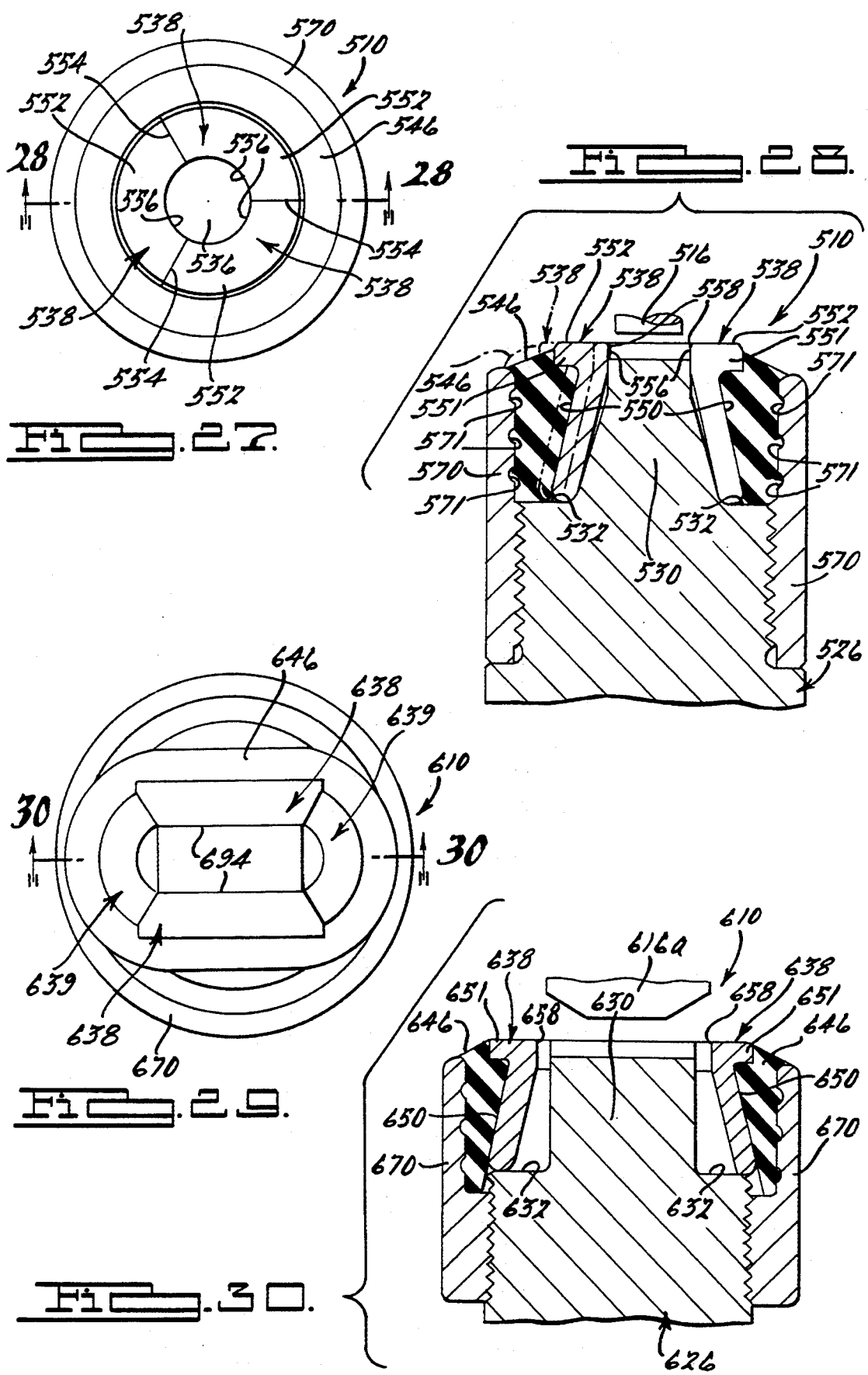

APPARATUS FOR JOINING SHEET MATERIAL

BACKGROUND AND SUMMARY OF THE INVENTION

This is a continuation-in-part of U.S. patent application, Ser. No. 927,214, filed Aug. 10, 1992 (now U.S. Pat. No. 5,267,383), which was a division of U.S. patent application, Ser. No. 694,141, filed May 1, 1991 (now issued as U.S. Pat. No. 5,150,513), which was a division of U.S. patent application, Ser. No. 68,579, filed Jan. 23, 1990 (now issued as U.S. Pat. No. 5,027,503), which was a division of U.S. patent application, Ser. No. 175,941, filed Mar. 31, 1988 (now issued as U.S. Pat. No. 4,910,853), which was a division of U.S. patent application, Ser. No. 853,130, filed Apr. 17, 1986 (now issued as U.S. Pat. No. 4,757,609), which was a continuation-in-part of U.S. patent application, Ser. No. 607,948, filed May 7, 1984 (now abandoned), which was a division of U.S. patent application, Ser. No. 495,440, filed May 17, 1983 (now issued as U.S. Pat. No. 4,459,735), which in turn was a continuation of U.S. patent application, Ser. No. 184,951, filed Sep. 8, 1980 (now abandoned). The disclosure of all of such patent applications and issued United States patents are hereby incorporated by reference herein.

The present invention relates generally to the joining of sheet metal or other sheet materials and more particularly to an apparatus for forming such joints, including leakproof and non-leakproof joints formed thereby.

It is old in the art to join a plurality of pieces of sheet metal by punching or otherwise manipulating them to cause them to be deformed into an interlocking relationship in a localized area. However, insofar as Applicant is aware, such joints typically require the shearing of the sheet material and hence are not suitable for leakproof applications unless a sealant is applied. The formation of such joints is also frequently destructive of the corrosion resistance of coated materials. In addition, the known apparatuses for forming the joints are frequently relatively complex in design, often requiring powered actuation of both a punch and one or more portions of the die, and frequently require expensive sliding die portions. This complexity increases the cost of the equipment, as well as the energy required for operation.

It has therefore been a primary object of the inventions of such above-mentioned applications and patents to provide an improved method and apparatus for permanently joining sheet metal or other sheet material items, with the capability of forming either leakproof joints or conventional "lanced" joints. Additional objects resided in the provision of forming apparatuses that included die members that were movable laterally, transverse to the longitudinal movement of a punch against an anvil between the dies. Such apparatuses were relatively simple but durable in construction, could utilize standard or specialized punches, required very little power, were compact and hence usable in many different applications, substantially preserved the corrosion resistance of coated sheet materials being joined, and were suited for use either as part of a small press or in C-frame holders in larger presses.

Another object of the inventions resided in the provision of improved die assemblies for use in sheet material joining apparatuses, and which were readily adapted to many different joint configurations, including conventional "lanced" joints as well as a novel leakproof joint formed by a radius-edged, non-shearing punch.

Further objects of the inventions of such patent applications and patents resided in the provision of novel leakproof joints for the sheet material as well as in the provision of novel methods for forming such joints.

Although these inventions performed well and were far superior to prior art apparatuses, the present application is directed to further, previously-disclosed aspects of these inventions, as well as to additional improvements and refinements thereon.

In accordance with the present invention, as defined in the appended claims, each of the preferred die members of the forming apparatus engage their adjacent die members in a substantially flush, no-gap relationship along laterally or radially-extending interfaces at least at the opening when the dies are in their closed positions. This feature provides for a more uniform and continuous periphery of the joints formed thereby, especially when the apparatus includes at least three of such die members, and preferably as many as six die members, or even more. This feature distinguishes the invention from prior collet-type die apparatuses, as well as from other types of forming apparatuses wherein the multiple die members are formed from a single piece of stock that is cut laterally to separate individual die members.

Furthermore, as is discussed in more detail below, the provision of larger numbers of die members or die segments contributes greatly to the stability of the forming apparatus by minimizing the tendency for any of the die members to become detached and separated from the die assembly or forming apparatus. This is the case especially in apparatuses for forming round joints, because each of the larger number of die members is required to move a shorter lateral distance away from the anvil during the forming of the interlocked joint than is the case with fewer numbers of die members, thus minimizing the tendency of any of the die members to be detached from the retention structure that holds the dies in place against the longitudinal advances and withdrawals of the punch.

The die assemblies according to the present invention can also be shorter (in the longitudinal direction), and thus more compact and useable in cramped applications where space is at a premium. In such applications, the moving parts of the die assembly (not including the punch) reside within an envelope having a longitudinal dimension no greater than the lateral dimension of the closed die opening into which the sheet material is then forcibly drawn by the punch during forming of the joint. This compact feature, which has previously not been practical (or even possible in previous designs, such as those using resilient collet-type die assemblies) greatly enhances the widespread applicability of the present invention.

The present invention also includes a stripper, or sheet material retainer, member that preferably has an outside diameter (or outer lateral dimension) at the area of longitudinal engagement with the sheet material to be formed that is greater than the inside diameter of the die opening when the dies are at their maximum laterally-outward open positions. This, coupled with strong forces urging the stripper/retainer longitudinally against the sheet material surrounding the joint in order to clamp the sheet material pieces together, greatly reduces (or substantially eliminates) the tendency for the joint material to flow longitudinally outward, away from the preferably-fixed anvil inside the die opening.

These features, along with others discussed in more detail below, yield die assemblies and forming apparatuses that are more durable and reliable, more versatile, more stable, more widely applicable (especially in cramped spaces), and that typically require less maintenance and less energy to operate than previous apparatuses.

These and other objects, features and advantages of the present invention will become apparent from the subsequent description and the appended claims, taken in conjunction with the accompanying drawings.

BRIEF DESCRIPTION THE DRAWINGS

FIG. 1 is a partial front elevational view of an apparatus incorporating at least some of the principles and features of the present invention, shown in its retracted position, the exemplary apparatus shown in FIG. 1 being adapted for forming a leakproof joint.

FIG. 2 is a view similar to FIG. 1, but showing the apparatus in its advanced position.

FIG. 3 is a view taken generally along line 3—3 in FIG. 1.

FIG. 4 is a partial sectional view taken generally along line 4—4 in FIG. 3.

FIG. 5 is a partial sectional view taken generally along line 5—5 in FIG. 3.

FIG. 6 is a perspective view of the die body of the apparatus shown in FIGS. 1 through 5.

FIG. 7 is an enlarged partial sectional view illustrating the leakproof joint of the present invention at the point of completion of its formation.

FIG. 8 illustrates dies for forming a plurality of different shaped joints according to the present invention.

FIG. 9 is a partially exploded perspective view of an exemplary alternative form of the die body for the apparatus shown in FIGS. 1 through 8.

FIG. 10 is a partial elevational view of a universal punch assembly suited for use with the die assembly of FIG. 9.

FIG. 11 is a partial front elevational view of another embodiment of a forming apparatus that is applicable to the formation of conventional "lanced" type joints.

FIG. 12 is a side elevational view of the apparatus of FIG. 11.

FIG. 13 is an enlarged partial sectional view of a "lanced" joint formed by the apparatus of FIGS. 11 and 12.

FIG. 14 is a partial sectional view taken generally along line 14—14 in FIG. 13.

FIG. 18 is a partial perspective view of still another embodiment of an apparatus incorporating the principles of the present invention, and which is applicable to the formation of conventional "lanced" type joints.

FIG. 18A is a partial perspective view illustrating a variation on the embodiment of FIG. 18, in which non-shearing die segments are added at the ends of the apparatus.

FIG. 19 is a partial sectional view of the apparatus of FIG. 18, taken generally along line 19—19 of FIG. 18, with the corresponding partial sectional view of the apparatus of FIG. 18A being generally similar except for the addition of the non-shearing end die segment.

FIG. 20 p view of a further embodiment of an apparatus adapted for the formation of a leakproof joint according to the present invention.

FIG. 21 is a partial sectional view taken generally along line 21—21 of FIG. 20.

FIG. 22 is a partial sectional view similar to that of FIG. 21, but illustrating a variation on the embodiment shown in FIGS. 20 and 21.

FIG. 23 is a top view of a still further embodiment of an apparatus adapted for formation of conventional "lanced" type joints.

FIG. 24 is a partial sectional view taken generally along line 24—24 of FIG. 23.

FIG. 25 is a partial sectional view taken generally along line 25—25 of FIG. 23.

FIG. 26 is an end view of four pieces of bar stock, diagrammatically illustrating a method, according to the present invention, by which a plurality of die segments for a joint-forming apparatus can be fabricated substantially simultaneously after the segments are placed in a substantially flush, no-gap engagement with adjacent segments.

FIG. 27 is a top view similar to that of FIG. 20, but illustrating still another embodiment of the present invention.

FIG. 28 is a partial sectional view taken generally along line 28—28 of FIG. 27.

FIG. 29 is a top view similar to that of FIG. 23, but illustrating still another embodiment of the present invention.

FIG. 30 is a partial sectional view taken generally along line 30—30 of FIG. 29.

Figure 31:
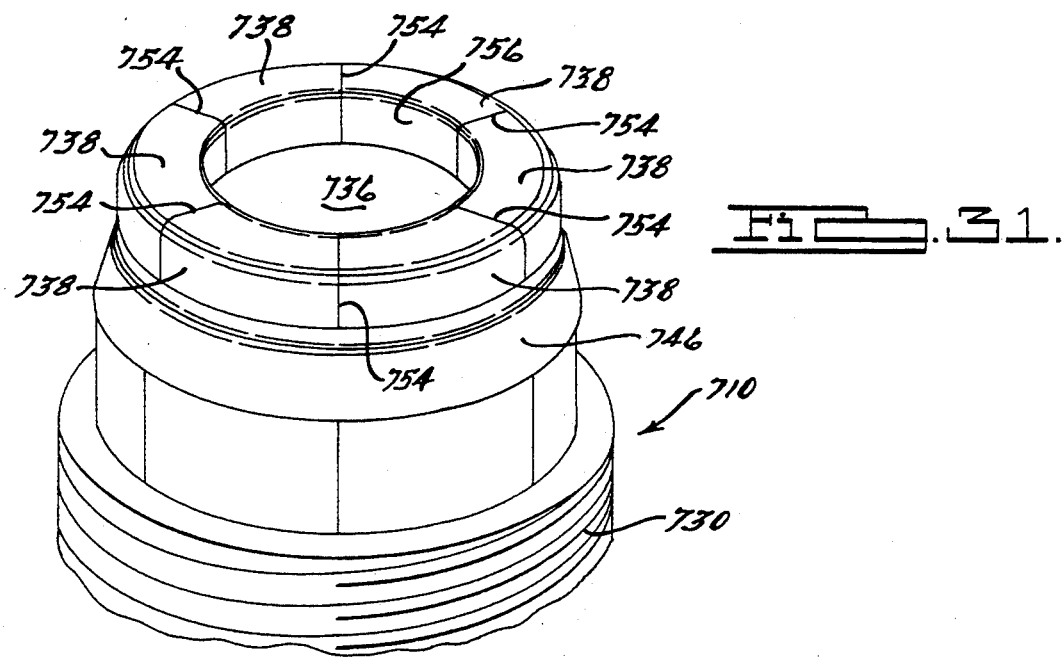

FIG. 31 is a partial perspective view of still another embodiment of an apparatus incorporating at least some of the principles and features of the present invention, and which is applicable to the formation of a leakproof joint according to the present invention.

Figure 32:
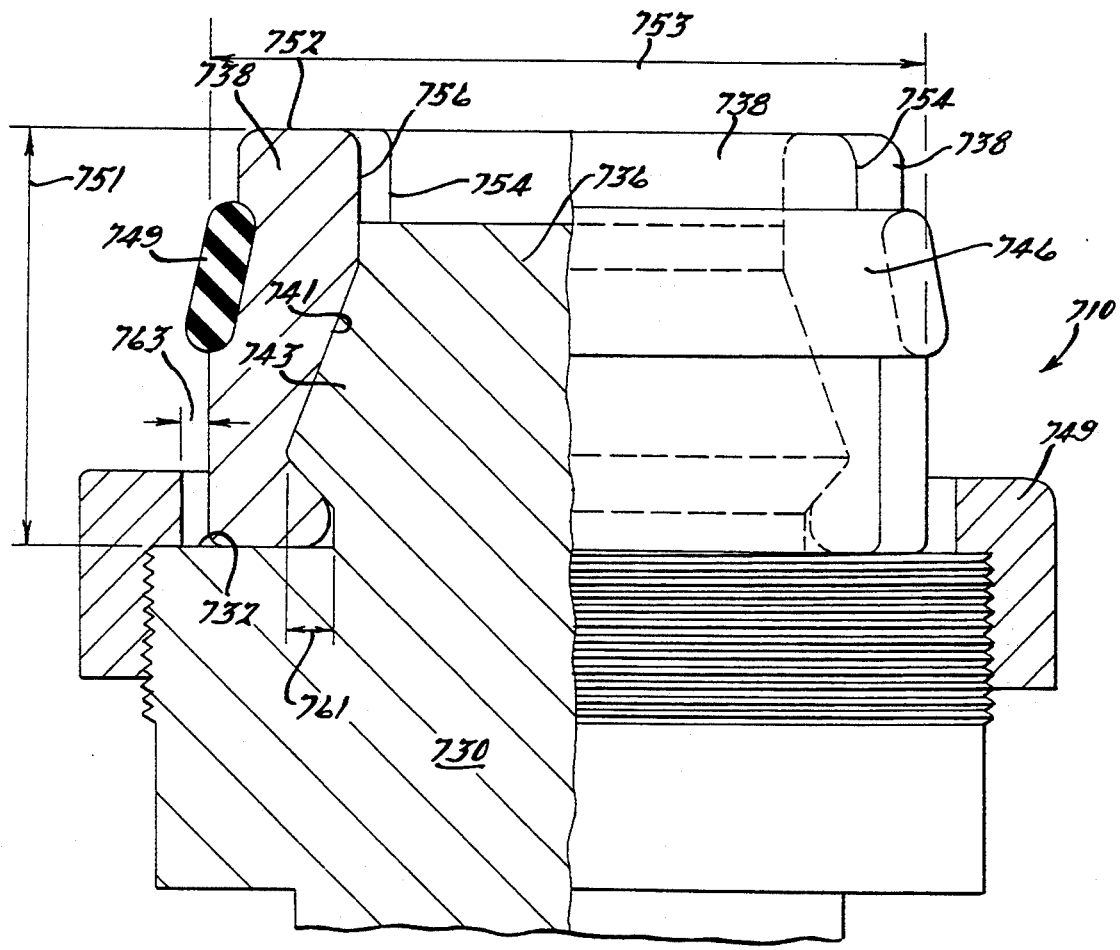

FIG. 32 is a partial elevational view of the apparatus of FIG. 31, with a portion of the apparatus shown in longitudinal cross-section.

Figure 33:
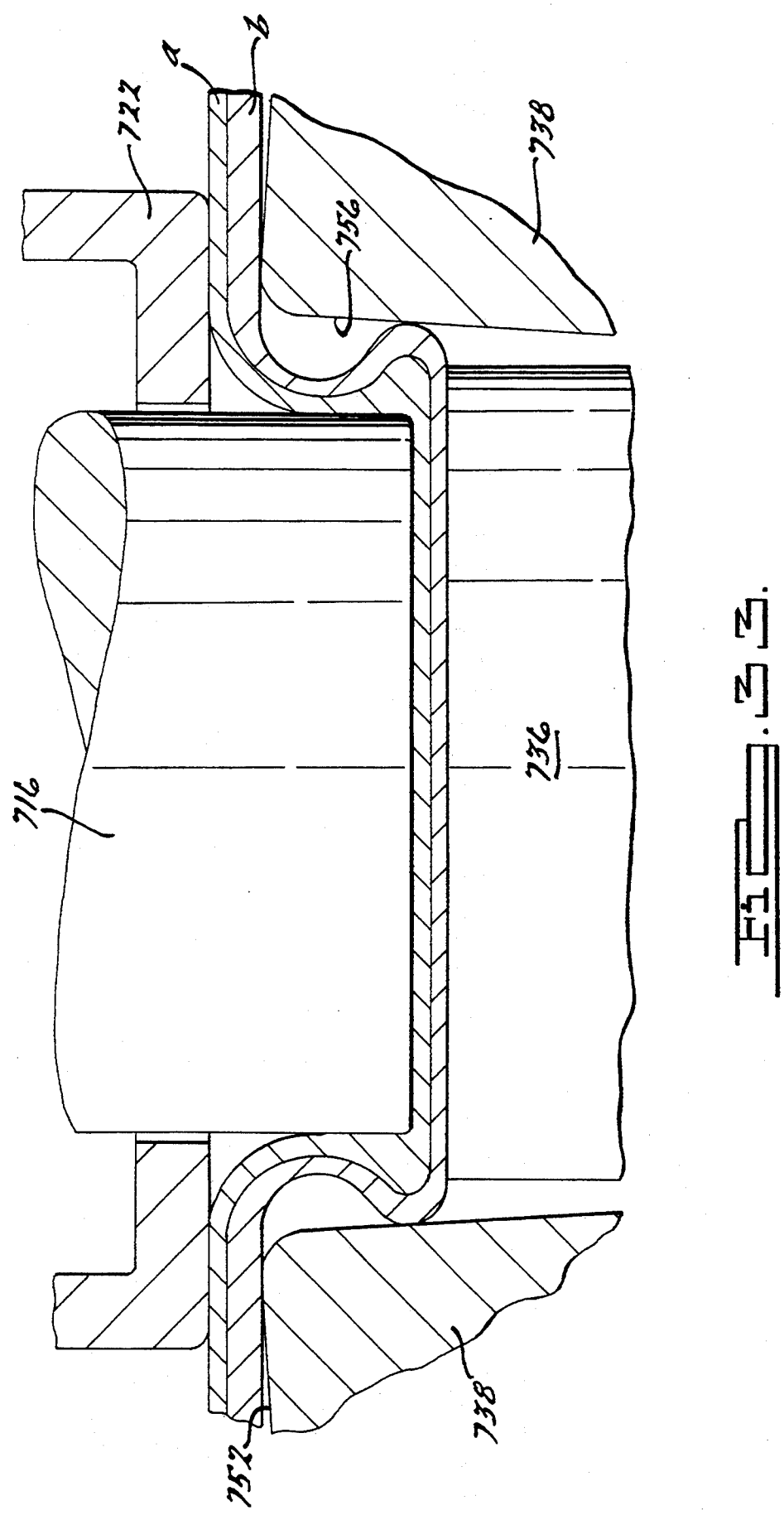

FIG. 33 is an enlarged, partial sectional view similar to FIG. 7 of the apparatus of FIGS. 31 and 32, illustrating the stripper/retainer member in place and showing the die assembly substantially at the point of completion of a leakproof joint according to the present invention.

Figure 34:
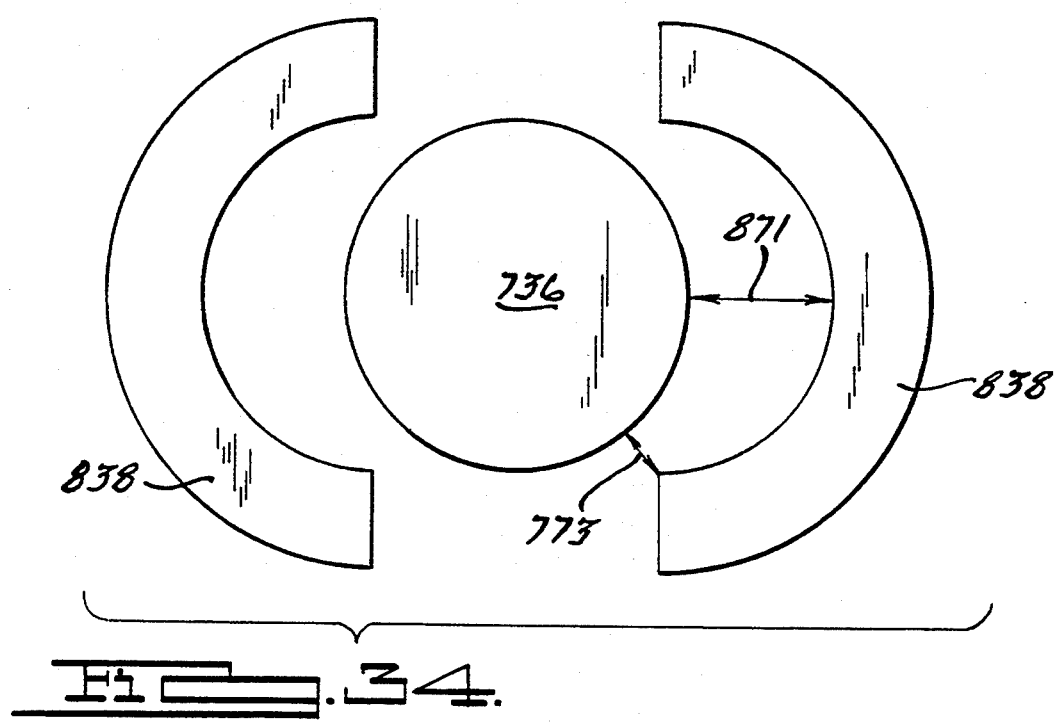

FIG. 34 is a diagrammatical outer end view of the die members and anvil of a two-jaw version of a for forming apparatus, illustrating the disadvantage of a relatively small number of die members.

Figure 35:
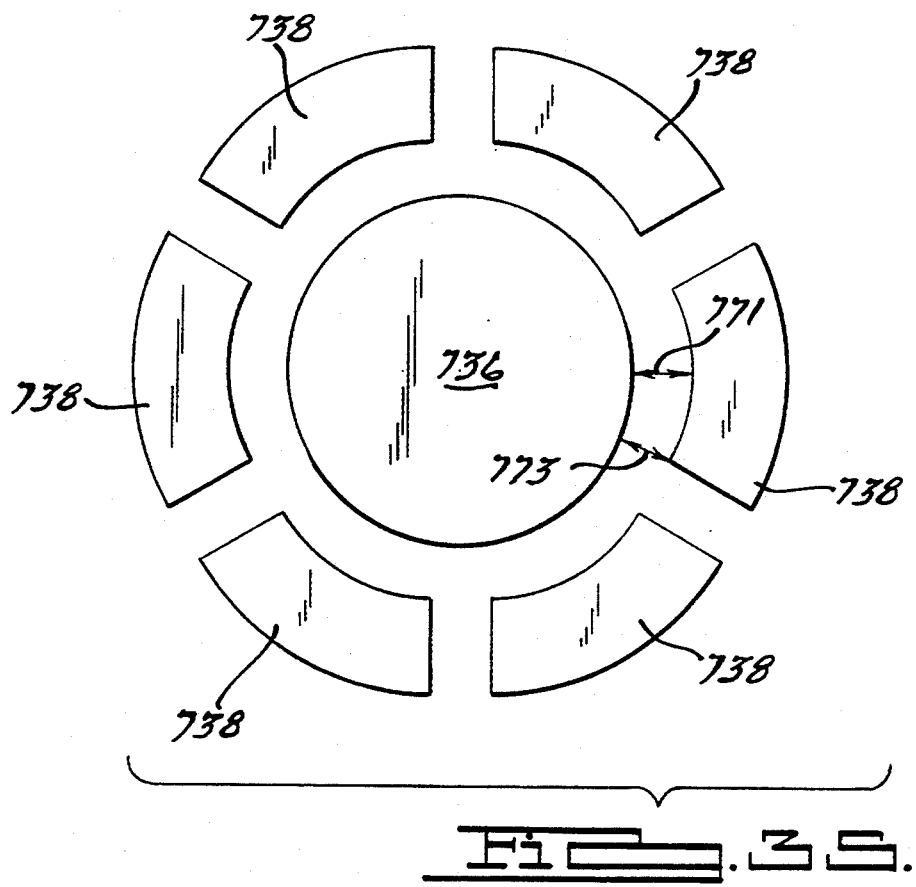

FIG. 35 is a diagrammatic outer end view, similar to that of FIG. 36, but illustrating the advantage of a relatively large number of die members.

DETAILED DESCRIPTION OF THE PREFERRED EMBODIMENTS

FIGS. 1 through 35 illustrate various exemplary embodiments of the present invention for purposes of illustration. One skilled in the art will readily recognize from the following discussion, taken together with the drawings, that the principles of the present invention are equally applicable to embodiments of the invention other than those shown in the drawings. One skilled in the art will also readily recognize that the principles of the present invention are applicable to both sheet metal as well as various other formable sheet materials.

Referring to FIGS. 1 through 6, there is shown a sheet metal joining apparatus generally comprising a die assembly 10 and a punch assembly 12 for joining two pieces of sheet metal or other formable sheet material indicated at a and b respectively. Although only two pieces of sheet material are shown, it is to be understood that more than two pieces may be joined in accordance with the principles of the present invention, depending upon the composition and thicknesses of sheet material in question. It is envisioned that the most common materials to be joined by the present invention will include sheet stock materials, such as aluminum, galvanized, brass, steel, etc., both coated and uncoated. The invention is particularly useful and advantageous in joining sheet material items composed of different materials where such dissimilar materials cannot be welded to one another.

Punch assembly 12 is of conventional construction, including a punch body 14 mounting a circular punch 16 (with radiused edges) and having a threaded portion 18 for threadably supporting a stripper retainer 20. Disposed within retainer 20 is a stripper 22 biased to its stripping position illustrated in FIG. 1 by means of coil springs 24. Punch 16 preferably has a smooth flat tip, with a small radius at the edge as shown in FIG. 7.

Die assembly 10 comprises cylindrical die body 26 mounted in the usual manner within a support structure 28 which may either be the lower leg of a conventional "C-frame" clamping device for use in a standard press, or the lower die supporting portion of a small press, such as a press of the type disclosed in Applicant's U.S. Pat. No. 3,730,044. Die body 26 is provided at its upper end (as shown) with an integral boss 30, illustrated primarily in FIGS. 5 and 6, from the opposite sides of which extend shoulders 32. Die body 26 is centrally bored and at the upper end thereof is provided a bore portion 34 in which is disposed (as by press fit) a hardened pin 36 which acts as an anvil or lower die member.

Pivotally supported on each side of die body 26, by means of roll pins 40 or other pivot members located in apertures 42, is a die portion or die segment 38. Each die portion or segment 38 is generally T-shaped in side elevation and is provided with two shoulders 44 engageable with two shoulders 32 on die body 26, so that vertical forces exerted on the die portions are transmitted directly to the die body and are not absorbed by pivot pins 40. Die portions 38 are relieved at 45 to facilitate limited rotational or pivotal movement between the respective positions illustrated in FIGS. 1 and 2, and are maintained in a normally closed position, as shown in FIG. 1, by means of a coil spring 46. Spring 46 passes through a suitable aperture 50 extending through boss 30 and biasingly acts between downwardly-extending integral legs 48 on die portions 38. It should be noted that the die portions 38, like the die portions in all the other embodiments for forming leakproof joints shown and described herein, abut one another in a substantially flush, no-gap engagement along laterally-extending faces when in their closed position. This results in a more consistent and more uniform laterally-outward flow of the sheet material when the joint is formed (as described below), as well as in a more smooth and continuous periphery of the formed joint.

When die portions 38 are in their closed position illustrated in FIG. 1, the upper surfaces 52 thereof lie in a common horizontal plane and the abutting faces of the die portions lie in a common vertical plane 54 (or planes 54 where more than two die portions are used). In this embodiment die portions 38 are each provided with a complementary semi-circular recess 56 centered on plane 54 and defining, when the die portions are in their closed position, an opening having a shape complementary to that of punch 16. Forces exerted downwardly on die portions 38 by punch 16 acting on the workpieces will not tend to pivot them away from one another because the pivotal axes defined by roll pins 40 are disposed laterally outwardly of the edges of the opening defined by recesses 56. Thus any downward force exerted on the die portions by the punch, such as when the punch initially enters the die opening, will tend to close, rather than open, the die assembly. In this embodiment the edge of the opening defined by recesses 56 should be chamfered or radiused, as indicated at 58 (FIGS. 1 and 7), to reduce the chance of fracturing or shearing the sheet material workpieces.

In operation, the apparatus is initially in the position illustrated in FIG. 1. Two or more sheet material items are first positioned in an overlapping or face-to-face relationship and then placed into the apparatus, as shown in FIG. 1, with the lower surface of the sheet material assembly disposed on surfaces 52 of die portions 38. Thereafter the press or other apparatus is actuated to cause the punch to move downwardly (as shown) towards material items a and b and die assembly 10.

Upon engagement of die punch 16 and the sheet material, portions 60 of the sheet material items a and b are deformed and drawn downwardly toward the upper surface of anvil 36. There is no fracturing or shearing of the material because of the provision of radius 58 around the periphery of the opening defined by recesses 56 and because of a preferably uniform clearance between die portions 38 and punch 16 with its radiused edge. The drawing action results directly from the co-action of the punch and the opening defined by recesses 56 in die portions 38. As punch 16 approaches anvil 36, within the die opening, and reaches a distance from anvil 36 that is less than the total combined original thickness of sheet material pieces a and b, there is a transverse or lateral extrusion of the sheet material portions 60 to form the laterally enlarged shape 62 in FIG. 7, which results in a mechanical interlock between sheet material pieces a and b. In this regard, it should be noted that FIG. 7 is not drawn to scale, but is intended to provide a representative illustration of the cross-sectional configuration of the material portions forming the joint.

The force of the lateral extrusion of sheet material portions 60 causes die portions 38 to pivot laterally outwardly, as best illustrated in FIGS. 2 and 7. A strong, permanent and leakproof joint having been formed, the punch is then withdrawn to the position illustrated in FIG. 1 and the workpiece removed. It is noteworthy that in Applicant's illustrated apparatus, only punch 16 requires actuation, and anvil 36 remains fixed. In certain applications, however, the punch can be stationary with the die assembly being actuable, or other arrangements providing for relative movement between the punch and die assembly can also be used. Upon removal of the workpiece, spring 46 causes die portions 38 to pivotally move back to their closed position illustrated in FIG. 1.

Shearing or lancing of the sheet material portions is avoided in the aforedescribed apparatus by providing radius 58 and an appropriate clearance between radiused-edged punch 16 and the opening defined by recesses 56. This clearance is preferably of uniform width. Although Applicant has not fully optimized the respective dimensions of the parts, the formulae below establish dimensions which have been found to provide very satisfactory results:

P=2 (M1+M2) (+/−20%)
D=P+0.8 (M1+M2)
T=0.2 (1.2 (M1+M2))
Where: P=punch diameter
D=die diameter
M1=top sheet material thickness
M2=bottom sheet material thickness
T=total sheet material thickness at center of joint These relationships have been found to at least be a satisfactory starting point. Once the punch diameters are chosen, and the apparatus is assembled and tested, satisfactory results can be obtained for the materials being joined by adjusting the bottom anvil height using the standard "shut height" adjustment (not shown) provided on conventional small presses and C-frames, thereby adjusting the distance between the bottom of the punch and the anvil when the press is at the end of its downward stroke.

Although the apparatus of the exemplary embodiment of FIGS. 1 through 7 illustrates the use of a circular punch, other shapes may be used, depending upon the application and the strength required. For example, FIG. 8 illustrates four different exemplary configurations which might be used. Die portions 38a are provided with three circular apertures 64 for those applications in which either the desired anti-rotation characteristics or the desired strength characteristics require more than a single circular joint. Die portions 38b have a diamond-shaped aperture 66 which is capable of providing a joint of strength comparable to that of the first embodiment, but yielding better antirotational characteristics. Die portions 38c have a triangular opening 68 which should give results similar to those of the diamond-shaped opening 66. Die portions 38d have an exemplary oval-shaped opening 70 providing a relatively large joint of high strength and high anti-rotational characteristics. Regardless of cross-sectional shape, the interior wall of the drawn portion of the upper piece of sheet material will typically be generally cylindrical in configuration.

FIG. 9 illustrates a universal type die body 26a, which is virtually identical to die body 26 of the first embodiment but is provided with a plurality of parallel vertically aligned holes 72, 74 and 76 adapted to receive hardened anvil pins 78, 80 and 82, respectively, in a press fit relationship. In applications where a single circular joint is sufficient, pins 78 and 82 may be removed from die body 26a, thus reducing the energy requirements of the apparatus. On the other hand, if greater strength or anti-rotation characteristics are desired, then one or two more additional pins may be inserted in the proper hole to provide additional joining capability. The die portions which would be affixed to die body 26a would have, a top configuration similar to that shown at 38a in FIG. 8, with openings 64 being designed to cooperate with pins 78, 80 and 82.

FIG. 10 illustrates the lower portion of a punch which can be used with the universal die body of FIG. 9. The punch body 84, can be conventional in all other respects and is provided with a plurality of press-fit hardened steel punch pins 86, 88 and 90 adapted to coact with anvils 78, 80 and 82, respectively, in the same manner that punch 16 coacts with anvil 36 in the embodiment of FIGS. 1 through 7. Suitable apertures 92 may be provided in the punch body 84 to permit removal of the punches for replacement or for reducing the number of punches for a particular application. The punch pins and anvils alternately can be non-circular in cross-section if desired in a particular application.

In FIGS. 11 and 12, a slightly modified version of the die assembly and punch is capable of forming conventional "lanced" type joints such as that illustrated in FIGS. 13 and 14. The die assembly 10a of this embodiment includes die body 26b and is substantially the same as die assembly 10 of the first embodiment (the same or similar reference numerals are used to indicate identical or similar parts in the embodiments of FIGS. 1 through 10 and FIGS. 11 and 12), except that die portions 38e are not provided with recesses to define a punch-receiving opening, but instead are provided with cutting edges 94. In addition, the anvil includes an integrally formed continuous flat generally horizontal surface 96 extending virtually the full length of cutting edges 94. Punch 16a of this embodiment is generally spade-shaped, having a width substantially the same as the distance between cutting edges 94 and having chamfered corners 98.

In FIGS. 13 and 14 sheet metal pieces or items c and d are shown as joined by the apparatus of FIGS. 11 and 12. As punch 16a moves downwardly toward the die assembly, sheet material portions 100 and 102 are lanced out of sheet material pieces c and d, respectively. These sheet material projections or portions 100 and 102 remain integrally attached to the parent material at the ends thereof, as best shown in FIG. 13, but are totally severed from the parent sheet material pieces c and d along their sides 104, as shown in FIG. 14. Continued advancement of the punch toward the anvil causes a transverse or lateral extruding of sheet material portions 100 and 102 to create the enlarged section shown in FIG. 14, which provides the necessary mechanical interlock to give the joint its integrity. However, as will be appreciated, because the sheet material is lanced, a joint of this type is not leakproof. As the sheet material portions are extruded laterally, they cause die portions 38e to pivot apart to accommodate the lateral extrusion.. Thus, the use of applicant's die assembly has been found to very satisfactorily permit the formation of this type of joint without the use of moving anvils and complex sliding dies.

Figure 15:
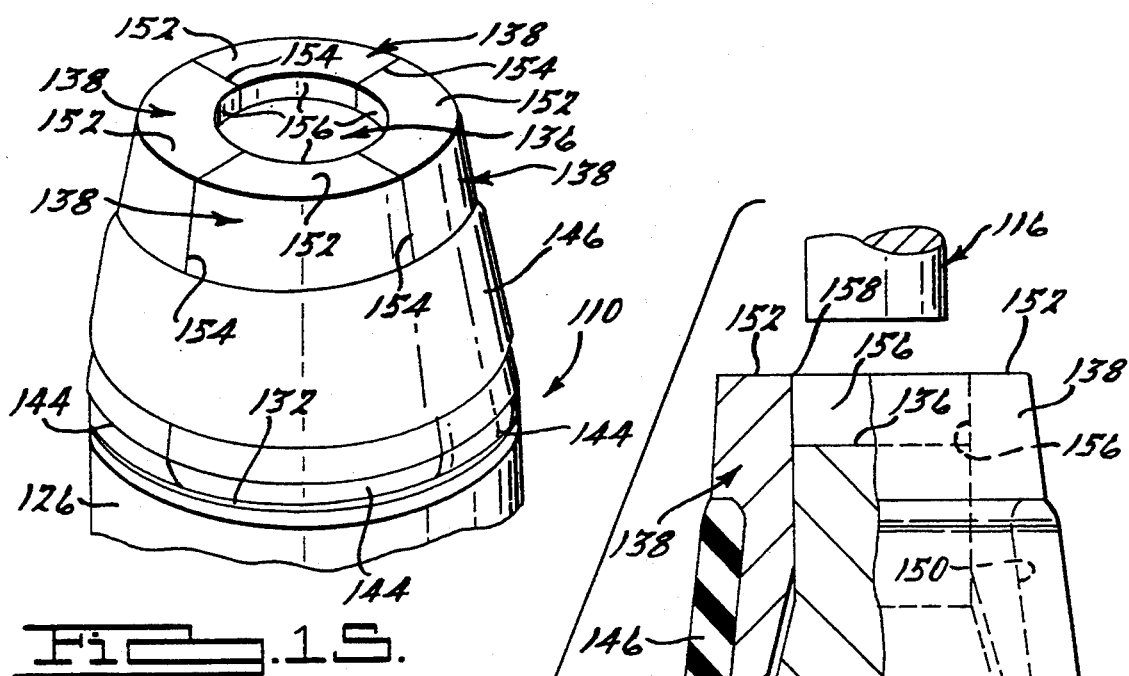
FIG. 15 is a partial perspective view of yet another embodiment of an apparatus incorporating at least some of the principles and features of the present invention, and which is applicable to the formation of a leakproof joint according to the present invention.
Figure 16:
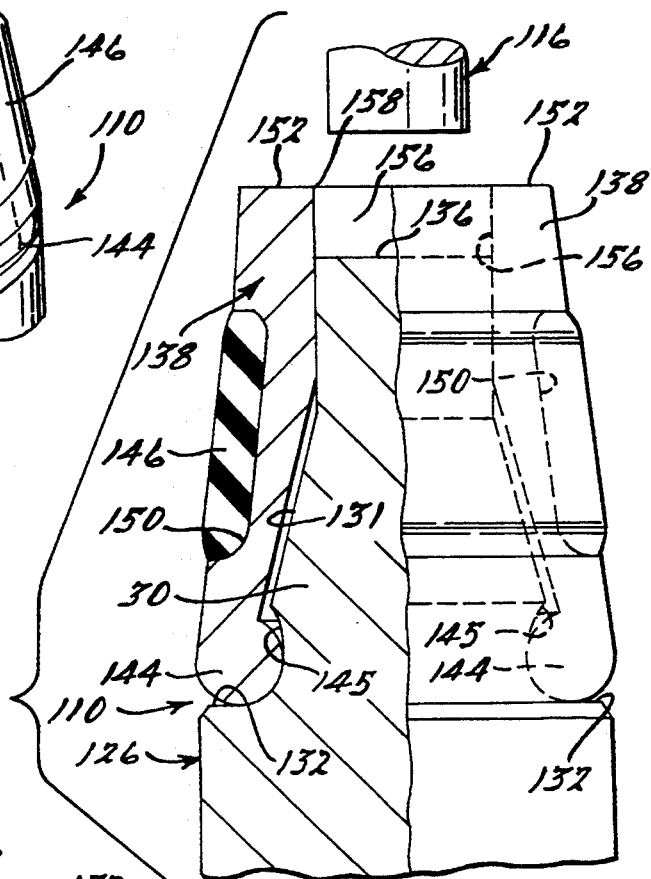
FIG. 16 is a partial elevational view of the apparatus of FIG. 15, with a portion of the apparatus shown longitudinal cross-section.
Figure 17:
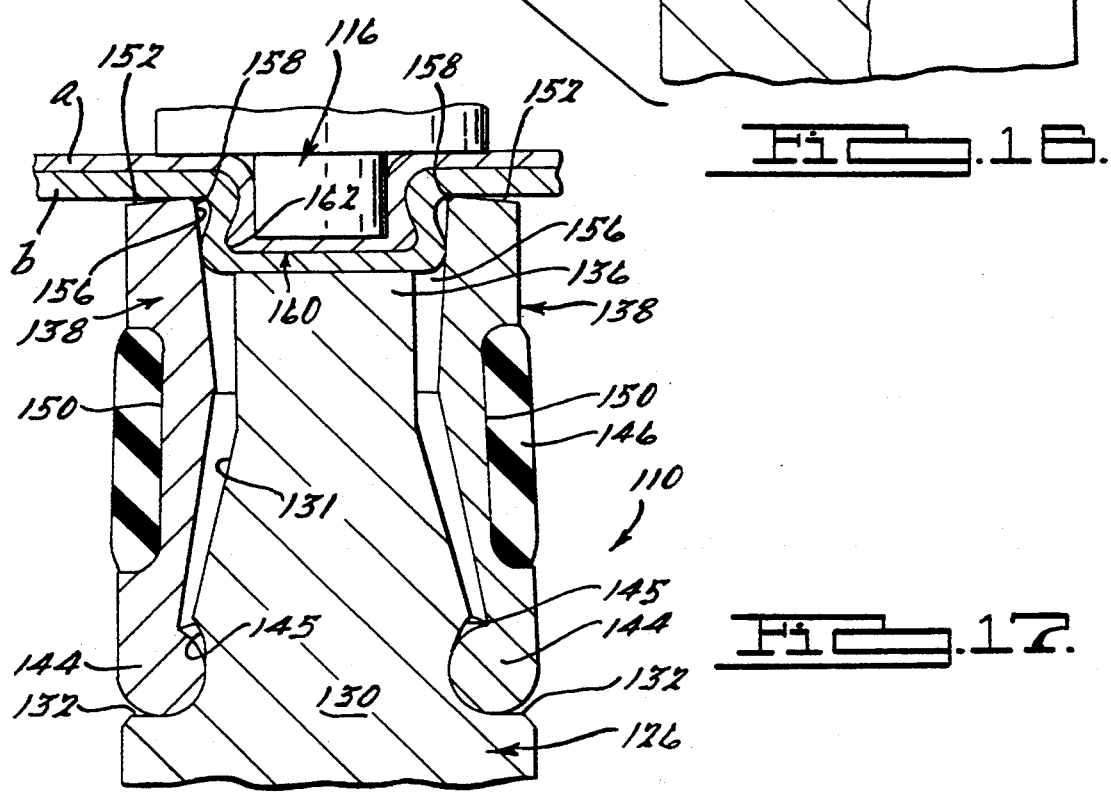
FIG. 17 is a partial sectional view of the apparatus of FIGS. 15 and 16, illustrating the apparatus substantially at the point of completion of a leakproof joint according to the present invention.

FIGS. 15 through 17 illustrate another embodiment of the apparatus for joining sheet material items to one another in a leakproof joint. In this embodiment, die assembly 110, which is adapted to cooperate with punch 116 to form the leakproof joint, includes die body 126 having an integral boss 130 and a circular annular shoulder 132 thereon. Integral boss 130 includes conical portion 131 interconnecting an anvil 136 with shoulder 132.

Two or more arcuate die segments 138 are disposed around boss 130 and include die segment shoulders 144, which are supported and engaged by shoulder 132 of die body 126. Boss 130 is provided with a circular annular relieved portion 145 adjacent the shoulder 132. This relieved portion 145 provides clearance so that the die segments 138 can primarily pivot outwardly about a lateral axis as the joint is being completed, in substantially the same manner as die portions 38 described above in connection with the embodiments of FIGS. 1 through 10.

Die portions 138 are maintained in their normally-closed position, shown in FIGS. 15 and 16, by means of a resilient, elastomeric band 146, which surrounds the lateral sides of die segments 138 in order to resiliently bias die segments 138 in a laterally inward direction toward the longitudinal axis of the die assembly. Resilient band 146 is received within, and longitudinally restrained by, a laterally inwardly recessed groove 150 extending circumferentially around the die segments 138. Although resilient band 146 can be composed of any of a wide variety of elastomeric materials suitable for particular applications of the present invention, it is preferred that resilient band 146 be composed of a urethane or urethane-containing material.

When die segments 138 are in their closed positions illustrated in FIGS. 15 and 16, the upper surfaces 152 lie in a common plane and the abutting faces of adjacent die segments lie in planes indicated by reference numeral 154. In the embodiment shown in FIGS. 15 and 16, die portions 138 are provided with circular inside faces or recesses 156 that define a circular opening generally complementary with the lateral cross-sectional shape of punch 116. Die portions 138 are also provided with radiused edge portions 158, and are preferably uniformly spaced from punch 116, in order to substantially avoid shearing or tearing sheet material items a and b during the deformation of sheet material. Like the embodiments shown in FIGS. 1 through 10, the downward force exerted on die portions 138 by punch 116 will tend (at least initially) to close, rather than open, the die assembly 110. This is because the primarily pivotal and longitudinally supported engagement of die segment shoulders 144 with die body shoulder 132 is at a laterally-outward position relative to edge portions 158. Furthermore, shoulder 132 defines a solid surface easily capable of handling the axial loads on die segments 138 during operation of the apparatus.

In operation, die assembly 110 is similar in function to die assembly 10 of FIGS. 1 through 10 described above. However, the resilient band 146, with its inwardly-biasing and circumferentially continuous relationship with die segments 138, is believed to cause die segments 138 to be more uniformly inwardly-biased, thereby providing for a more uniform and controlled deformation of sheet material portions 160 into the circular opening formed by die segments 138. The resilient band in any of the embodiments of FIGS. 15 through 26 also offers the advantage of retaining the various die components in their proper positions and alignment, while providing for ease and convenience of disassembly. Furthermore, the respective clearances of the parts are based on the same criteria as used in the embodiments of FIGS. 1-10, so that sheet material portions 60 are drawn into the opening defined by recesses 156 in a non-fractured and non-sheared uniform configuration. As in the original embodiments, the action of punch 116 against anvil 136 causes lateral extrusion of the sheet material to form the leakproof joint, in the manner illustrated in FIG. 17. The resilient band 146, in addition to contributing to a uniform and controlled formation of a joint, also provides substantial simplicity and economy in the manufacture, operation and maintenance of the die assembly.

Although the exemplary embodiment shown in FIGS. 15 through 17 illustrates the use of a circular punch 116, other shapes may be used, depending upon the particular application and the strength required. Examples of such shapes, and the modifications necessary to the apparatus in order to form such shapes, are shown in FIGS. 8 through 10 and are discussed above. Also, it should be noted that the number of die segments in any of the embodiments shown is for purposes of illustration only, and the various embodiments of the invention can have two die segments, or any other reasonable number of die segments.

FIGS. 18 through 19 illustrate modified versions of die assembly 110 cooperable with a punch for forming conventional "lanced" type joints, such as illustrated in FIGS. 13 and 14. Die assembly 210 of this embodiment of the invention differs from that of FIGS. 15 through 17 in that die portions 238 are not provided with semicircular recesses 156 in order to define a circular opening for receiving a punch. Rather, die segments 238 are provided with substantially straight cutting edges 294 cooperable with a generally spade-shaped punch 216, which is substantially similar in shape to punch 16a shown in FIGS. 11 and 12. In virtually all respects, the embodiments of FIGS. 18 and 19 function in a manner similar to that of die assembly 10a shown in FIGS. 11 and 12, but is afforded the advantages in terms of uniformity of inward biasing, simplicity, and economy provided by a resilient, elastomeric band 246, which is substantially identical in composition and function to resilient band 146 shown in FIGS. 15 through 17.

FIG. 18A illustrates a variation of the die assembly 210 of FIGS. 18 and 19, wherein die assembly 210A includes the addition of non-shearing die segments 239A at each end of anvil 236A. Such end die segments 239A are preferably equipped with radiused corners 258A and are spaced from punch 216 a sufficient distance, so that shearing or tearing of the sheet material is substantially avoided at the end portions of the deformed sheet material portions. Thus, with such an embodiment, the end portions can be shaped and supported as desired or needed during forming of the lanced joint, while still restricting the shearing of the sheet material to the cutting edges 294 or 294A of the die assemblies 210 or 210A, respectively.

FIGS. 20 through 22 illustrate variations on still another embodiment of an apparatus for forming a leakproof sheet material joint, wherein die assembly 310 of FIGS. 20 and 21 includes die segments 338 defining a generally circular opening and being resiliently inwardly-biased by a resilient, elastomeric band 346. Unlike the somewhat similar embodiment of the invention shown in FIGS. 15 through 17, die body 326 does not include a relieved portion between its conical portion 331 of boss 330 and shoulder portion 332. Thus, the arcuately-shaped die segments 338 do not initially pivot (at least primarily) in an outward lateral direction, but rather are provided with planar end surfaces 334 so that they can primarily slide (at least initially) on shoulder 332 (which is widened in this embodiment) during operation of the die assembly 310. However, as in all the embodiments described herein, it is contemplated that all of the die segments will move (pivot and/or slide) to approximately the same degree, so that the joint will be as uniform as possible.

Die assembly 310 also differs from die assembly 110 (FIGS. 15 through 17) in that die segments 338 are provided with outside surfaces 350 which terminate at flanges 351 for locating and longitudinally restraining resilient, elastomeric band 346. Also, in order to substantially minimize possible damage to die segments 338 and to resilient band 346, such as would be caused by excessive laterally-outward movement of die segments 338 or physical abuse, the die body 326 is equipped with a sleeve 370 threaded thereto. Sleeve 370 surrounds die segments 338 and resilient band 346, thereby protecting and limiting the laterally-outward movement thereof. It should also be noted that the sleeve 370 can also be advantageously employed to minimize the possibility of damage to the die segments and resilient biasing means in the various other embodiments of the present invention, whether adapted for forming leakproof joints or adapted for forming "lanced" joints, independently of whether such embodiments employ pivoting or sliding die segments.

FIG. 22 illustrates a variation of the embodiment of FIGS. 20 and 21. Die assembly 310A is substantially identical to die assembly 310 of FIGS. 20 and 21, with the exception of the eliminations of sleeve 370, which is replaced by a ring 372 laterally surrounding die segments 338 and preferably longitudinally captured between resilient band 346 and the flanges 351 of die segments 338. Limiting ring 372 functions generally in the same manner as sleeve 370, insofar as it limits lateral outward movement of the die segments in order to minimize possible damage to the die segments and the resilient band caused by excessive laterally outward, sliding or pivoting movement. Like sleeve 370, limiting ring 372 can also be so adapted for use in the other embodiments, although their shapes may have to be appropriately modified in applications where the joint is not circular, such by making them generally oval or rectangular in shape.

FIGS. 23 through 25 illustrate a die assembly 410, which is generally similar to the die assemblies 310 and 310A of FIGS. 20 through 22, in that die assembly 410 is provided with primarily slidable die segments 438 and 439. However, die assembly 410 is also somewhat similar to die assembly 210A of FIG. 18A, in that it is provided with a pair of straight-sided die segments 438 having shearing edges 494, as well as a pair of nonshearing die segments 439, in order to define a generally rectangular opening generally complementary in shape with at least a portion of the spade-shaped punch 416, and is thereby adapted to form the "lanced" joint in the manner described above. The die segments 438 and 439 are laterally surrounded and inwardly biased by a resilient, elastomeric band 446, which is similar to the resilient bands discussed above.

It should be noted that die assembly 410 is preferably equipped with non-shearing, end die segments 439 having radiused edges 458 thereon. In the exemplary embodiment of die assembly 410 shown in FIGS. 23 through 25, die segments 439 are arcuately-shaped and are preferably identical and interchangeable with the arcuate die segments 338 of the embodiments shown in FIGS. 20 through 22. Such interchangeability of die segments greatly contributes to the simplicity and economy of manufacture and operation of die assemblies according to the present invention.

FIG. 26 illustrates, in schematic or diagrammatic form, a very simple method for fabricating a number (in this case four) of die segments of the type described herein, substantially simultaneously. Four pieces of square bar stock 180 of suitable dimensions, and composed of a preselected material from which the die segments are to be formed, are bundled and chucked together with their sides in a mutually mating engagement, as shown in FIG. 26. They are then turned simultaneously to form the outside contour 186, such as by using a suitable cutting tool 184, and then bored simultaneously, in the usual manner, to form the inner peripheral shape 188 of the die segments 138 (for example). Alternatively, the pieces of bar stock 180 can be held rotationally stationary while suitable cutting tools move to perform the desired operations. Once the outer and inner shapes 184 and 186, respectively, are formed the pieces are unchucked to create the four exemplary die segments 138. Such a process substantially assures uniformity in the forming of the die segments, as well as greatly contributing to the ease, speed, and economy associated with the die fabricating process.

FIGS. 27 through 30 illustrate still other alternate embodiments of the present invention in which the embodiment of FIGS. 27 and 28 is somewhat similar to that of FIGS. 20 and 21. However, the resilient, elastomeric band 546 is integrally molded onto the die assembly 510, between the die segments 538 and the limiting sleeve 570, and compressibly expands during movement of the die segments 538, as shown in FIG. 28. In order to enhance the adhesion or retention of the elastomeric band 546 within the sleeve 570, a number of grooves 571 are preferably provided in the interior of the sleeve 570. Similarly, FIGS. 29 and 30 illustrate a variation on the embodiment of FIGS. 23 through 25, but wherein a resilient, elastomeric band 646 is integrally molded between the die segments 638 and 639 and the limiting sleeve 670, in a manner similar to that of the embodiment of FIGS. 27 and 28.

It should be noted that such a resilient, elastomeric band can be provided and integrally molded, as discussed above, onto at least any of the embodiments shown in FIGS. 15 through 30. The provision of such an integrally-molded band advantageously allows the die assembly to be provided as a unitized, one-piece assembly for installation on a joint-forming apparatus. Furthermore, this construction is also believed to allow the relieved portions, such as those indicated by reference numerals 145 and 245 shown in FIGS. 15 through 19, to be eliminated or at least substantially minimized.

FIGS. 31 through 33 and 35 illustrate yet another exemplary embodiment of the apparatus for joining sheet material items in a leakproof joint. The components of apparatus 710 of FIGS. 31 through 33 and 35 are generally similar in configuration and function to those of the apparatus described above and shown in the preceding figures. Thus the components of apparatus 710 are indicated by reference numerals that correspond to those of corresponding components in the preceding figures, but which have seven-hundred prefixes.

In the exemplary apparatus 710, however, six die portions or segments 738 are provided, each in a substantially flush, no-gap engagement with its adjacent die segments, at least at die opening 756, when in their closed positions, along laterally-extending adjacent faces or interfaces 754, as was described above in connection with other embodiments. Die segments 738 are biased into their normally-closed positions by means of a resilient band 746, which (like the resilient bands of the previously-described embodiments) can be composed of an elastomeric material, a spring steel (or other metal) material, or any of a number of known resilient or elastic materials. Die segments 738 preferably have indentations 741 extending laterally-outwardly on their inner sides that engage enlarged portion 743 on the preferably fixed anvil member 730, thus restraining them longitudinally and preventing them from becoming detached from the assembly during joint forming and punch withdrawal. In this regard, the enlarged portion 743 on anvil 730 is preferably enlarged such that the lateral distance 761 by which die segments 738 overlap enlarged anvil portion 743 at their longitudinal inner ends is greater than the maximum outward lateral movement 771 of die segments 738. This relationship keeps die segments 738 from becoming detached from the assembly during large die movements, such as those encountered when forming relatively soft materials, such as aluminum, for example.

It should be noted that although apparatus 710 includes resilient band 746 for biasing die segments 738 into the substantially flush, no-gap engagement with one another in their closed position, and that although die segments 738 are retained by the overlapping or longitudinally interlocking of inner indentations 741 with enlarged portion 743 on fixed anvil 730, the features of apparatus 710 described herein and shown in FIGS. 31 through 33 and 34 can also be incorporated into a joint-forming apparatus similar to apparatus 10, as shown in FIGS. 1 through 14, with three or more die segments 38 mounted for pivotal movement about a corresponding number of pins 40 and supported longitudinally on corresponding die engagement shoulders fixed relative to anvil structure 36 and 26.

Furthermore, as is the case with previously-discussed embodiments, die segments 738 are supported and restrained from longitudinal movement as the punch forces the sheet material into die opening 756 by their engagement with shoulder 732 on die member 730. It should further be noted, as is the case with previously-discussed embodiments, that die segments 738 can pivot laterally outwardly, slide laterally outwardly, or even move in an outwardly-directed combination of pivoting and sliding, when the sheet material is pressed by the punch against the fixed anvil portion 736 and 1.5 caused to flow or extrude outwardly to interlock the sheet material items to one another. Such laterally-outward movement of die segments 738 is preferably also limited, however, by limiting ring 749, threaded or otherwise secured to anvil member 730.

Although six die segments 738 are shown in exemplary apparatus 710, a larger number of die segments can be employed (preferably no less than three) in order to obtain the advantages discussed herein, in terms of more uniform outward sheet material flow, smoother and more continuous joint peripheries, and increased stability and reliability of the die assembly due to reduced maximum outward die segment movement.

In order to allow apparatus 710 to be used in cramped, space-limited applications, it is preferred that the longitudinal dimensions of the die assembly components be kept at a minimum. Such minimizing of longitudinal dimensions is limited by many previous die assembly configurations, especially in those employing die finger-type collet arrangements where the fingers must be long enough to be sufficiently flexible to not oppose the lateral extension of the joint material. Making the fingers short but thin does not solve the problem because then they cannot withstand the axial column loading necessary to create the joint. In apparatus 710, however, these longitudinal space requirements are minimized because all of the moving components (i.e., die segments 738 and resilient band 746) can be completely disposed within an envelope having a longitudinal or axial dimension 75 1 (in FIG. 32) that is no greater than the diametrical or lateral dimension 753 of die segments 738 in their closed position. This same compact relationship is also seen in FIGS. 21, 22, 24, 25, 28 and 30. Even in the very first embodiment the axial length is not greater than the approximate diameter of the dies when fully open (see FIG. 2). This relationship results in a greatly increased applicability of the joint-forming apparatus in many complex, space-conscious applications.

As shown in FIG. 33, stripper 722 serves to clamp sheet material items a and b tightly together, both before and during the forming of the joint. In this regard, as is the case with other previously-discussed embodiments, stripper 722 preferably has an outside diameter, or lateral outer dimension, that is larger than that of lateral dimension of die opening 756, when die segments 738 are in their maximum open position (as shown in FIG. 33). The inner diameter, or inner dimension, of stripper 722 is also fitted closely to the outer surface of punch 716. In this way, stripper 722 serves a draw ring function and maintains the tight clamping engagement of the sheet material items to one another all during the joint-forming operation, as well as substantially preventing or minimizing unwanted dimpling of the formed joint find undesirable longitudinally-outward flow of the sheet material "up" the punch toward the open end of die opening 756.

Finally, as is diagrammatically illustrated in FIGS. 34 and 35, the provision of a relatively large number of die segments 738 contributes to the stability of die segments 738, as well as coacting with the flush, no-gap engagement of adjacent die segments 738 to provide for more uniform laterally-outward sheet material flow and a smoother, more uniform and continuous joint periphery. In the two-jaw die segment arrangement schematically illustrated in FIG. 34, each die segment 838 must move outward a relatively great lateral distance 871 in order to allow the die segment edges to move a lateral distance 773 far enough away from anvil portion 736 to allow for the laterally outward flow of the sheet material during the final stages of the forming of the joint. In contrast, as is illustrated in FIG. 35, the provision of a greater number of die segments 738 allows for the same laterally-outward movement 773 of the die segment edges, while requiring a much smaller laterally-outward movement 771 of die segments 738. Furthermore, the gaps between the open die segments 738 in FIG. 35 are much smaller than the gaps between die segments 838 in FIG. 34 at their maximum open positions. Thus, as can be readily seen from a comparison of FIGS. 34 and 35, the provision of relatively larger numbers of die segments reduces the tendency for die segments 738 to become disengaged or detached from enlarged portion 743 of anvil 730, as well as reducing the gaps between the open die segments 738 so as to minimize the tendency for the sheet material to flow laterally outward between the open die segments. These factors are especially pronounced and, advantageously reduced when joint sheet material items made of thicker, softer, more flowable materials, such as aluminum, for example.

The foregoing discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

What is claimed is:

1. An apparatus for joining sheet material items, comprising: punch means;
   at least three die portions defining a die opening in said apparatus for receiving said punch means, said punch means and said die portions being movable relative to one another in a generally longitudinal direction;
   fixed anvil means located in said opening;
   die movement means providing for laterally-outward movement of said die portions away from one another from a closed position to an open position in response to said punch means compressing the sheet material into said die opening and against said fixed anvil means, said compressing occurring without shearing the sheet material, and said die movement means causing the sheet material to deform generally laterally outwardly in said die opening without shearing the sheet material;
   each of said die portions having laterally-extending opposite sides thereon for engaging adjacent die portions in a substantially flush, no-gap relationship at said die opening when said die portions are in said closed position;
   die engagement portions longitudinally fixed relative to said fixed anvil means on said apparatus for engaging and longitudinally supporting said die portions in engagement with said die engagement portions during said movement of said die portions away from one another; and
   biasing means for resiliently urging said die portions in a generally inward lateral direction in order to resiliently bias said die portions generally toward one another.

2. An apparatus according to claim 1, wherein said die movement means provides for slidable movement of said die portions relative to one another.

3. An apparatus according to claim 1, wherein said die movement means provides for pivotal movement of said die portions relative to one another.

4. An apparatus according to claim 1, wherein said die movement means provides for translational movement of said die portions relative to one another.

5. An apparatus according to claim 1, wherein said die engagement portions include generally laterally-extending surfaces thereon.

6. An apparatus according to claim 1, wherein said die movement means provides for pivotal and translational movement of said die portions relative to one another.

7. An apparatus according to claim 1, wherein said die portions lie within a die space having a longitudinal dimension no greater than the maximum lateral dimension of said die portions when said die portions are in said closed position.

8. An apparatus according to claim 7, wherein said biasing means also lies within said die space.

9. An apparatus according to claim 1, wherein said punch means has a radiused edge at an end thereof oriented toward said die opening, and said die portions also having radiused edges at ends thereof oriented toward said punch means, so as to avoid shearing the sheet material.

10. An apparatus according to claim 1, further including stripper means for clamping the sheet material items to one another during longitudinal movement of said punch means and said die portions toward and away from one another, said stripper means having an outside lateral dimension greater than the lateral dimension of said die opening when said die portions are in their maximum open position.

11. An apparatus according to claim 1, wherein said die portions have indentations extending laterally outwardly into inner surfaces thereof, said fixed anvil means having an enlarged portion protruding laterally outwardly therefrom, said enlarged anvil portion extending laterally outwardly into said die portion indentations when said die portions are in said closed position a distance greater than the maximum laterally-outward movement of said die portions in order to restrict longitudinal movement of said die portions away from said die engagement portions.

12. An apparatus according to claim 1, wherein said biasing means substantially surrounds said die portions.

13. An apparatus for joining sheet material items, comprising: punch means;
   a number of die portions defining a die opening in said apparatus for receiving said punch means, said punch means and said die portions being movable relative to one another in a generally longitudinal direction;
   fixed anvil means located in said opening; die movement means providing for movement of said die portions away from one another from a closed position to an open position in response to said punch means compressing the sheet material into said die opening and against said fixed anvil means, said compressing occurring without shearing the sheet material, and said die movement means causing the sheet material to deform generally laterally outwardly in said die opening without shearing the sheet material, said die portions lying within a die space having a longitudinal dimension no greater than the maximum lateral dimension of said die portions when said die portions are in a closed position;
   die engagement portions longitudinally fixed relative to said fixed anvil means on said apparatus for engaging and longitudinally supporting said portions in engagement with said die engagement portions during said movement of said die portions away from one another; and
   biasing means for resiliently urging said die portions in a generally inward lateral direction in order to resiliently bias said die portions generally toward one another.

14. An apparatus according to claim 13, wherein said die movement means provides for slidable movement of said die portions relative to one another.

15. An apparatus according to claim 13, wherein said die movement means provides for pivotal movement of said die portions relative to one another.

16. An apparatus according to claim 13, wherein said die movement means provides for translational movement of said die portions relative to one another.

17. An apparatus according to claim 13, wherein said die engagement portions include generally laterally-extending surfaces thereon.

18. An apparatus according to claim 13, wherein said die movement means provides for pivotal and translational movement of said die portions relative to one another.

19. An apparatus according to claim 13, wherein said biasing means also lies within said die space.

20. An apparatus according to claim 19, wherein each of said die portions has laterally-extending sides thereon for engaging adjacent die portions in a substantially flush, no-gap relationship at said die opening when said die portions are in said closed position.

21. An apparatus according to claim 13, wherein said punch means has a radiused edge at an end thereof oriented toward said die opening, and said die portions also having radiused edges at ends thereof oriented toward said punch means, so as to avoid shearing the sheet material.

22. An apparatus according to claim 13, further including stripper means for clamping the sheet material items to one another during longitudinal movement of said punch means and said die portions toward and away from one another, said stripper means having an outside lateral dimension greater than the lateral dimension of said die opening when said die portions are in their maximum open position.

23. An apparatus according to claim 13, wherein said die portions have indentations extending laterally outwardly into inner surfaces thereof, said fixed anvil means having an enlarged portion protruding laterally outwardly therefrom, said enlarged anvil portion extending laterally outwardly into said die portion indentations when said die portions are in said closed position a distance greater than the maximum laterally-outward movement of said die portions in order to restrict longitudinal movement of said die portions away from said die engagement portions.

24. An apparatus according to claim 13, wherein said biasing means substantially surrounds said die portions.

25. An apparatus for joining sheet material items, comprising: punch means;
 a number of die portions defining a die opening in said apparatus for receiving said punch means, said punch means and said die portions being movable relative to one another in a generally longitudinal direction;
 fixed anvil means located in said opening;
 die movement means providing for movement of said die portions away from one another from a closed position to an open position in response to said punch means compressing the sheet material into said die opening and against said fixed anvil means, said compressing occurring without shearing the sheet material, and said die movement means causing the sheet material to deform generally laterally outwardly in said die opening without shearing the sheet material;
 die engagement portions longitudinally fixed relative to said fixed anvil means on said apparatus for engaging and longitudinally supporting said die portions in engagement with said die engagement portions during said movement of said die portions away from one another;
 biasing means for resiliently urging said die portions in a generally inward lateral direction in order to resiliently bias said die portions generally toward one another; and
 stripper means for clamping the sheet material items to one another during longitudinal movement of said punch means and said die portions toward and away from one another, said stripper means having an outside lateral dimension greater than the lateral dimension of said die opening when said die portions are in their maximum open position.

26. An apparatus according to claim 25, wherein said die movement means provides for slidable movement of said die portions relative to one another.

27. An apparatus according to claim 25, wherein said die movement means provides for pivotal movement of said die portions relative to one another.

28. An apparatus according to claim 25, wherein said die movement means provides for translational movement of said die portions relative to one another.

29. An apparatus according to claim 25, wherein said die engagement portions include generally laterally-extending surfaces thereon.

30. An apparatus according to claim 25, wherein said die movement means provides for pivotal and translational movement of said die portions relative to one another.

31. An apparatus according to claim 25, wherein said die portions lie within a die space having a longitudinal dimension no greater than the maximum lateral dimension of said die portions when said die portions are in said closed position.

32. An apparatus according to claim 31, wherein said biasing means also lies within said die space.

33. An apparatus according to claim 25, wherein said punch means has a radiused edge at an end thereof oriented toward said die opening, and said die portions also having radiused edges at ends thereof oriented toward said punch means, so as to avoid shearing the sheet material.

34. An apparatus according to claim 25, wherein said die portions have indentations extending laterally outwardly into inner surfaces thereof, said fixed anvil means having an enlarged portion protruding laterally outwardly therefrom, said enlarged anvil portion extending laterally outwardly into said die portion indentations when said die portions are in said closed position a distance greater than the maximum laterally-outward movement of said die portions in order to restrict longitudinal movement of said die portions away from said die engagement portions.

35. An apparatus according to claim 34, wherein each of said die portions has laterally-extending sides thereon for engaging adjacent die portions in a substantially flush, no-gap relationship at said die opening when said die portions are in said closed position.

36. An apparatus according to claim 25, wherein said biasing means substantially surrounds said die portions.

37. An apparatus for joining sheet material items, comprising: punch means;
 a number of die portions defining a die opening in said apparatus for receiving said punch means, said punch means and said die portions being movable relative to one another in a generally longitudinal direction;
 fixed anvil means located in said opening; die movement means providing for movement of said die portions away from one another from a closed position to an open position in response to said punch means compressing the sheet material into said die opening and against said fixed anvil means, said compressing occurring without shearing the sheet material, and said die movement means causing the sheet material to deform generally laterally outwardly in said die opening without shearing the sheet material;
 die engagement portions longitudinally fixed relative to said fixed anvil means on said apparatus for engaging and longitudinally supporting said die portions in engagement with said die engagement portions during said movement of said die portions away from one another;

said die portions having indentations extending laterally outwardly into inner surfaces thereof, said fixed anvil means having an enlarged portion protruding laterally outwardly therefrom, said enlarged anvil portion extending laterally outwardly into said die indentations when said die portions are in said closed position a distance greater than the maximum laterally outward movement of said die portions in order to restrict longitudinal movement of said die portions away from said die engagement portions; and biasing means for resiliently urging said die portions in a generally inward lateral direction in order to resiliently bias said die portions generally toward one another.

38. An apparatus according to claim 37, wherein said die movement means provides for slidable movement of said die portions relative to one another.

39. An apparatus according to claim 37, wherein said die movement means provides for pivotal movement of said die portions relative to one another.

40. An apparatus according to claim 37, wherein said die movement means provides for translational movement of said die portions relative to one another.

41. An apparatus according to claim 37, wherein said die engagement portions include generally laterally-extending surfaces thereon.

42. An apparatus according to claim 37, wherein said die movement means provides for pivotal and translational movement of said die portions relative to one another.

43. An apparatus according to claim 37, wherein said die portions lie within a die space having a longitudinal dimension no greater than the maximum lateral dimension of said die portions when said die portions are in said closed position.

44. An apparatus according to claim 43, wherein said biasing means also lies within said die space.

45. An apparatus according to claim 43, wherein each of said die portions has laterally-extending sides thereon for engaging adjacent die portions in a substantially flush, no-gap relationship at said die opening when said die portions are in said closed position.

46. An apparatus according to claim 45, wherein said die portions lie within a die space having a longitudinal dimension no greater than the maximum lateral dimension of said die portions when said die portions are in said closed position.

47. An apparatus according to claim 46, wherein said biasing means also lies within said die space.

48. An apparatus according to claim 46, further including stripper means for clamping the sheet material items to one another during longitudinal movement of said punch means and said die portions toward and away from one another, said stripper means having an outside lateral dimension greater than the lateral dimension of said die opening when said die portions are in their maximum open position.

49. An apparatus according to claim 48, wherein said biasing means substantially surrounds said die portions.

50. An apparatus according to claim 49, wherein said die movement means provides for slidable movement of said die portions relative to one another.

51. An apparatus according to claim 49, wherein said die movement means provides for pivotal movement of said die portions relative to one another.

52. An apparatus according to claim 49, wherein said die movement means provides for translational movement of said die portions relative to one another.

53. An apparatus according to claim 49, wherein said die engagement portions include generally laterally-extending surfaces thereon.

54. An apparatus according to claim 49, wherein said die movement means provides for pivotal and translational movement of said die portions relative to one another.

55. An apparatus according to claim 37, wherein said punch means has a radiused edge at an end thereof oriented toward said die opening, and said die portions also having radiused edges at ends thereof oriented toward said punch means, so as to avoid shearing the sheet material.

56. An apparatus according to claim 37, further including stripper means for clamping the sheet material items to one another during longitudinal movement of said punch means and said die portions toward and away from one another, said stripper means having an outside lateral dimension greater than the lateral dimension of said die opening when said die portions are in their maximum open position.

57. An apparatus according to claim 37, wherein said biasing means substantially surrounds said die portions.

* * * * *

UNITED STATES PATENT AND TRADEMARK OFFICE
CERTIFICATE OF CORRECTION

PATENT NO. : 5,435,049
DATED : July 25, 1995
INVENTOR(S) : Edwin G. Sawdon

It is certified that error appears in the above-indentified patent and that said Letters Patent is hereby corrected as shown below:

Column 1, line 11, "68,579" should be -- 468,579 --.

Column 1, line 24, ":issued" should be -- issued --.

Column 4, line 9, "p" should read --is a top--.

Column 4, line 55, delete "for".

Column 5, line 57, ".aperture" should be -- aperture --.

Column 8, line 51, delete "." (second occurrence).

Column 9, line 25, delete "." (third occurrence).

Column 13, line 40, delete "1.5".

Column 14, line 2, "75 1" should be -- 751 --.

UNITED STATES PATENT AND TRADEMARK OFFICE
CERTIFICATE OF CORRECTION

PATENT NO. : 5,435,049
DATED : July 25, 1995
INVENTOR(S) : Edwin G. Sawdon

It is certified that error appears in the above-indentified patent and that said Letters Patent is hereby corrected as shown below:

Column 14, line 28, "find" should be -- and --.

Column 15, line 5, begin new paragraph with "punch".

Column 16, line 20, begin new paragraph with "punch".

Column 16, line 26, begin new paragraph with "die".

Column 17, line 35, begin new paragraph with "punch".

Column 18, line 49, begin new paragraph with "punch".

Column 18, line 55, begin new paragraph with "die".

Column 19, line 14, begin new paragraph with "biasing".

Signed and Sealed this

Eighteenth Day of June, 1996

Attest:

BRUCE LEHMAN

*Attesting Officer*     *Commissioner of Patents and Trademarks*